(12) United States Patent
Ronte

(10) Patent No.: US 10,355,906 B2
(45) Date of Patent: Jul. 16, 2019

(54) SYNCHRONIZATION DEVICE AND SYNCHRONIZATION METHOD

(71) Applicant: ANRITSU CORPORATION, Kanagawa (JP)

(72) Inventor: Sunao Ronte, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/052,753

(22) Filed: Aug. 2, 2018

(65) Prior Publication Data
US 2019/0044780 A1    Feb. 7, 2019

(30) Foreign Application Priority Data

Aug. 4, 2017  (JP) .................................. 2017-151641
May 16, 2018  (JP) .................................. 2018-094411

(51) Int. Cl.
| | |
|---|---|
| *H04L 27/26* | (2006.01) |
| *H04L 7/06* | (2006.01) |
| *H04L 7/04* | (2006.01) |

(52) U.S. Cl.
CPC .......... *H04L 27/2659* (2013.01); *H04L 7/042* (2013.01); *H04L 7/06* (2013.01); *H04L 27/265* (2013.01); *H04L 27/2646* (2013.01); *H04L 27/2663* (2013.01); *H04L 27/2665* (2013.01); *H04L 27/2671* (2013.01); *H04L 27/2673* (2013.01); *H04L 27/2672* (2013.01)

(58) Field of Classification Search
CPC ............. H04L 27/2659; H04L 27/2646; H04L 27/2663; H04L 27/265; H04L 27/2665; H04L 27/2671; H04L 7/042; H04L 7/06; H04L 27/2673; H04L 27/2672

USPC .................................................. 375/260, 261
See application file for complete search history.

(56) References Cited

U.S. PATENT DOCUMENTS

| | | | |
|---|---|---|---|
| 8,532,201 B2* | 9/2013 | Park ..................... | H04L 27/2659 375/260 |
| 2010/0246698 A1* | 9/2010 | Jin ....................... | H04L 27/2659 375/260 |

OTHER PUBLICATIONS

Gerhard Wunder, et al., "5GNOW: Non-orthogonal, Asynchronous Waveforms for Future Mobile Applications", 5G Wireless Communication Systems: Prospects and Challenges, IEEE Communications Magazine, Feb. 2014, pp. 97-105.

(Continued)

*Primary Examiner* — Chieh M Fan
*Assistant Examiner* — Fitwi Y Hailegiorgis
(74) *Attorney, Agent, or Firm* — Pearne & Gordon LLP

(57) ABSTRACT

A synchronization device has a signal reception unit and a signal generation unit. The latter provides a multicarrier signal, which serves as an internally transmitted signal. The former receives the same type of externally received signal as the internally transmitted signal. An STO timing detection unit detects a position at which a correlation value in the correlation calculation between sampled data of the internally transmitted signal shifted at a predetermined sampling interval and sampled data of the externally received signal is maximum as an STO timing. A difference calculation unit calculates a difference between phases of the externally received signal and the internally transmitted signal at each subcarrier in a state in which the STO timing is detected. A correction control unit executes correction control on the signal generation unit such that a difference in a phase of each calculated subcarrier is added as a correction amount.

20 Claims, 7 Drawing Sheets

(56) References Cited

OTHER PUBLICATIONS

M. Bellanger, et al., "FBMC Physical Layer: A Primer", PHYDYAS, Jun. 2010, pp. 1-31, (http://www.ict-phydyas.org).
Frank Schaich, et al., "Waveform contenders for 5G—suitability for short packet and low latency transmissions", Vehicular Technology Conference, Alcatel-Lucent AG, Bell Labs, Stuttgart, Germany, 2014.
Nicola Michailow, et al., "Generalized Frequency Division Multiplexing for 5th Generation Cellular Networks", IEEE Transactions on Communications, vol. 62, No. 9, Sep. 2014, pp. 3045-3061.

* cited by examiner

| pij | 00 | 01 | 11 | 10 |
|---|---|---|---|---|
| 00 | (−3,+3) | (−3,+1) | (−3,−1) | (−3,−3) |
| 01 | (−1,+3) | (+1,−1) | (−1,−1) | (−1,−3) |
| 11 | (+1,+3) | (+1,+1) | (+1,−1) | (+1,−3) |
| 10 | (+3,+3) | (+3,+1) | (+3,−1) | (+3,−3) |

| Scheme | (A1,B1) | (A2,B2) | (A3,B3) | (A4,B4) | (A5,B5) |
|---|---|---|---|---|---|
| State variable | X1 | X2 | X3 | X4 | X5 |
| CP-OFDM | $(0, M_M)$ | $(T_{iFFT}, 0)$ | $(S_{CP}, 0)$ | | |
| UF-OFDM | $(0, M_M)$ | $(T_{iFFT}, 0)$ | $(F_P, 0)$ | | |
| FBMC (Frequency) | $(0, M_M)$ | $(F_U, 0)$ | $(T_{iFFT}, 0)$ | $(F_{PPM}, 0)$ | $(F_{DET}, 0)$ |
| FBMC (Time) | $(0, M_M)$ | $(F_\beta, 0)$ | $(T_{iFFT}, 0)$ | | |
| GFDM | $(0, M_M)$ | $(M_T, 0)$ | $(F_{PS}, 0)$ | $(T_{iDFT}, 0)$ | $(S_{CP}, 0)$ |
| Windowing OFDM | $(0, M_M)$ | $(T_{iFFT}, 0)$ | $(S_{CP}, 0)$ | $(S_{WIN}, 0)$ | |

FIG. 8

SYNCHRONIZATION DEVICE AND SYNCHRONIZATION METHOD

TECHNICAL FIELD

The present invention relates to a synchronization device and a synchronization method for multicarrier signals using a synchronization processing technology for a modulated or demodulated signal of a wireless access physical layer in a 5G wireless communication radio access technology (RAT).

BACKGROUND ART

In the next generation 5G communication, wireless interfaces for high speed, broadband, and low latency in wireless bandwidths are requested and measurement test devices for new interfaces are also requested.

In the standardization association 3GPP of the 5G wireless access interfaces, standard examination of a wireless scheme is in progress to achieve effective use of new transmission efficiency by suppressing leakage of signals outside of a channel bandwidth of a CP-OFDM signal operated in the existent standard 4G or the like and so that bandwidth rates can coexist for each level of a subcarrier group.

Specifically, when an uncertain constraint in a frequency and a time domain of a modulated signal is considered in an OFDM modulated or demodulated signal applied to a sub-channel, various schemes of considering a leakage suppression scheme for a signal outside a bandwidth in accordance with a policy for setting maintenance of temporal smoothness in a time domain as a basis in wireless transmission have been naturally examined.

For example, when obtaining temporal smoothness of a modulated signal is considered as a basis, application of a filtering scheme is mainly classified into FBMC, UF-OFDM, and GFDM schemes (see Non-Patent Documents 1, 2, 3, and 4 below) as variations of the filter application schemes. In each application scheme, time multiplexing is used for a channel together in an individual channel in units of channel groups, and examination of a scheme of executing filtering in a channel multiplexed group or a scheme of executing a windowing process on a CP-OFDM signal and additionally executing new temporal smoothness is in progress.

RELATED ART DOCUMENT

Non-Patent Document

[Non-Patent Document 1] 5GNOW: Non-Orthogonal, Asynchronous Waveforms for Future Mobile Applications, IEEE Communications Magazine, February 2014
[Non-Patent Document 2] M. Bellanger et al., "FBMC physical layer: a primer", 2010
[Non-Patent Document 3] Frank Schaich et al., "Waveform contenders for 5G-suitability for short packet and low latency transmissions", Vehicular Technology Conference, 2014 IEEE 79th
[Non-Patent Document 4] Nicola Michailow et al. "Generalized Frequency Division Multiplexing for 5th Generation Cellular Networks", IEEE Transactions on Communications, Vol. 62, No. 9, 2014

DISCLOSURE OF THE INVENTION

Problem that the Invention is to Solve

Incidentally, in each of the above-described schemes, its characteristics exhibit depending on a use case to be applied. Therefore, a synchronization circuit, a synchronization method, and a measurement method at the time of receiving a signal to correspond to various schemes become practical problems. Therefore, it is preferable to provide a synchronization device and a synchronization method capable of handling synchronization of various communication schemes.

Accordingly, the invention is devised in view of the foregoing problems and an object of the invention is to provide a synchronization device and a synchronization method capable of handling synchronization of various communication schemes.

Means for Solving the Problem

To achieve the object of the invention, according to claim 1, a synchronization device includes a signal generation unit 2 that sets the number of subcarriers, information regarding a synchronization code, a signal generation operator, and an order of calculation necessary to generate a predetermined type of multicarrier signal and generates a multicarrier signal in which the synchronization code is embedded in a symbol in accordance with the number of subcarriers, as an internally transmitted signal, based on the calculation of the signal generation operator, the number of subcarriers, and the information regarding the synchronization code in the order; a signal reception unit 3 that receives the same type of multicarrier signal as the internally transmitted signal as an externally received signal from outside and samples the externally received signal at each sampling interval; a time sequence data conversion unit 4 that samples the internally transmitted signal generated by the signal generation unit at each sampling interval and outputs sampled data of the internally transmitted signal shifted at the sampling interval; a correlation processing unit 5 that executes correlation calculation between the sampled data of the internally transmitted signal and sampled data of the externally received signal; an STO timing detection unit 6 that detects a position at which a correlation value in the correlation calculation of the correlation processing unit is maximum as an STO timing; a first FFT unit 7 that executes fast Fourier transform on the sampled data of the externally received signal; a second FFT unit 8 that executes fast Fourier transform on the sampled data of the internally transmitted signal; a difference calculation unit 9 that calculates a difference between a phase of each subcarrier of the externally received signal obtained in the first FFT unit and a phase of each subcarrier of the internally transmitted signal obtained in the second FFT unit; and a correction control unit 10 that executes correction control on the signal generation unit such that a difference in a phase of each subcarrier in a state in which the STO timing calculated in the difference calculation unit is detected is added as a correction amount.

According to claim 2, in the synchronization device according to claim 1, the signal generation unit may include a scenario composing unit (11) that acquires the type of multicarrier signal and the number of subcarriers and sets signal generation operators an order of calculation necessary to generate the type of multicarrier signal, and an execution unit (12) that acquires the number of input signals in accordance with the number of subcarriers and generate the multicarrier signal from the input signals by calculating the signal generation operators in the order. The signal generation operators may be operators ($A_k$, $B_k$) granting time characteristics, frequency characteristic, or through/zero characteristics specified with a suffix k indicating the order, and the operator $B_k$ may be further a mapping conversion operator of an input signal vector U. The operator $A_k$ may set a state variable $X_k$ (where k=1, . . . , K) indicating a generation course signal of the multicarrier signal as an operational target, and The predetermined multicarrier signal may be generated by repeatedly operating the operators $(A_k, B_k)$ by a recurrence formula of Expression (1) below in accordance with the suffix k.

[Math. 1]

$$X_k = A_k X_{k-1} + B_k U \quad \text{Expression (1)}$$

According to claim 3, in the synchronization device according to claim 2, the scenario composing unit (11) may acquire characteristics to be added to the multicarrier signal and set characteristic addition operators and an order of calculation necessary to add the characteristics. The execution unit may add the characteristics to the generated multicarrier signal by calculating the characteristic addition operators in the order. The characteristic addition operators may be operators $(C_k, D_k)$ granting characteristics necessary for transmission path distortion, signal evaluation, and device evaluation such as through and zero to the generation course signal, and the operator $D_k$ may be an operator of disturbance noise V. An evaluation multicarrier signal to which the predetermined characteristics are granted may be generated by repeatedly applying the operators $(C_k, D_k)$ by a recurrence formula of Expression (2) below in accordance with the suffix k.

[Math. 2]

$$Y = C_k X_k + D_k V \quad \text{Expression (2)}$$

According to claim 4, in the synchronization device according to any one of claims 1 to 3, the state variable $X_k$ may be divided into a plurality of vectors $Xd_{1k}$ and $Xd_{2k}$. Expression (1) above may be applied to the divided vector $Xd_{1k}$ and other vector $Xd_{2k}$ of the state variable to generate a first generation course signal $Xd_{1k}$ (where k=1, . . . , K) from the divided vector $Xd_{1k}$ of the state variable and generate a second generation course signal $Xd_{2k}$ (where k=1, . . . , K) from the other vector $Xd_{2k}$, the first and second generation course signals may be generation course signals on a frequency axis or a time axis, a generation course signal $X_{k\_}$New1 in which $Xd_{1k}$ (where k=K) and $Xd_{2k}$ (where k=K) are connected may be generated on the frequency axis, and a generation course signal $X_{k\_}$New2 in which $Xd_{1k}$ (where k=K) and $Xd_{2k}$ (where k=K) are added may be generated on the time axis.

According to claim 5, in the synchronization device according to claim 4, a signal may be generated by applying Expression (1) above to the generation course signal $X_{k\_}$New1 or the generation course signal $X_{k\_}$New2.

According to claim 6, in the synchronization device according to claim 5, a multicarrier signal may be generated by further applying Expression (2) to the signal generated by applying Expression (1) above to the generation course signal $X_{k\_}$New1 or the generation course signal $X_{k\_}$New2.

According to claim 7, in the synchronization device according to claim 4, a plurality of signals in which generation courses are different may be generated by connecting a second multicarrier signal $Xc2_k$ (where k=K) generated in a generation course from k=1 to K different from the first multicarrier signal from a second symbol located after a first symbol by Expression (1), above to a first multicarrier signal $Xc1_k$ (where k=K) generated in a generation course from k=1 to K from the first symbol by Expression (1) above on the time axis.

According to claim 8, in the synchronization device according to any one of claims 1 to 7, with regard to the signal generation operators and the order of the calculation set in the scenario composing unit (11), Bp1 in a generation course of k=p1 may be a mapping conversion operator of the input signal vector U. Ap2 may be an operator of inverse Fourier transform in a generation course of k=p2. When there is CP for synchronization, a generation course of k=p3 is added, a signal generation operator Ap3 in the generation course of k=p3 may be an operator adding the CP for synchronization, and 1≤p1<p2<p3<N is satisfied. When a filtering process is executed, a generation course of k=p4 may be added, a signal generation operator Ap4 in the generation course of k=p4 may be an operator adding the filtering process, and p4<p2 and p4<p3 or p2<p4 may be satisfied. When a windowing process is executed, a generation course of k=p5 may be added, a signal generation operator Ap5 in the generation course of k=p5 may be an operator adding the windowing process, and p4<p5<N may be satisfied, Ap1=Bp2=Bp3=Bp4=Bp5=0 may be satisfied. The scenario composing unit may set the signal generation operators and the order of the calculation by combining the operators in accordance with presence or absence of the CP for synchronization, presence or absence of the filtering process, or presence or absence of the windowing process.

According to claim 9, in the synchronization device according to any one of claims 1 to 8, when $X_k$ is a state vector indicating a state variable of each subcarrier as a vector, Y is an output vector, $A_k$, $B_k$, $C_k$, and $D_k$ are operators used for the state variable, U is an input vector indicating an input signal of each subcarrier as a vector, the correction control unit 10 may execute calculation of Expressions (1) and (2) above and update the state vector by Expression (3) below using a correction operator Op ($F_C$) generated from the correction amount at a front stage at which inverse fast Fourier transform or inverse discrete time Fourier transform is executed.

[Math. 3]

$$X_{k+1} = O_p(F_C) * X_k \quad \text{Expression (3)}$$

According to claim 10, in the synchronization device according to any one of claims 1 to 9, the time sequence data conversion unit 4 may generate time sequence data of a sample point at a time of Ts+mΔT (where m is an integer) at which Ts is a reference when Ts is the sampling interval.

According to claim 11, a synchronization method includes: a step of setting the number of subcarriers, information regarding a synchronization code, a signal generation operator, and an order of calculation necessary to generate a predetermined type of multicarrier signal and generating a multicarrier signal in which the synchronization code is embedded in a symbol in accordance with the number of subcarriers, as an internally transmitted signal, based on the calculation of the signal generation operator, the number of subcarriers, and the information regarding the synchronization code in the order; a step of receiving the same type of multicarrier signal as the internally transmitted signal as an externally received signal from outside and sampling the externally received signal at each sampling interval; a step of sampling the internally transmitted signal at each sampling interval and outputting sampled data of the internally transmitted signal shifted at the predetermined sampling interval; a step of executing correlation calculation between the sampled data of the internally transmitted signal and sampled data of the externally received signal; a step of detecting a position at which a correlation value in the correlation calculation is maximum as an STO timing; a step of executing fast Fourier transform on the sampled data of the externally received signal; a step of executing fast Fourier transform on the sampled data of the internally transmitted signal; a step of calculating a difference between a phase of each subcarrier of the externally received signal obtained in the fast Fourier transform and a phase of each subcarrier of the internally transmitted signal obtained in the fast Fourier transform process; and a step of executing correction control such on generation of the internally transmitted signal that a difference in a phase of each subcarrier in a state in which the STO timing is detected is added as a correction amount.

According to claim 12, the synchronization method according to claim 11 may further include a step of executing calculation of Expressions (4) and (5) above when $X_k$ is a state vector indicating a state variable of each subcarrier as a vector, Y is an output vector, $A_k$, $B_k$, $C_k$, and $D_k$ are operators used for the state variable, U is an input vector indicating an input signal of each subcarrier as a vector; and a step of updating the state vector by Expression (6) below using a correction operator Op ($F_C$) generated from the correction amount at a front stage at which inverse fast Fourier transform or inverse discrete time Fourier transform is executed.

[Math. 4]

$$X_k = A_k X_{k-1} B_k U \qquad \text{Expressions (4)}$$

[Math. 5]

$$Y = C_k X_k + D_k V \qquad \text{Expression (5)}$$

[Math. 6]

$$X_{k+1} = O_p(F_C) * X_k \qquad \text{Expression (6)}$$

According to claim 13, the synchronization method according to claim 11 or 12 may further include a step of generating time sequence data of a sample point at a time of Ts+mΔT (where m is an integer) at which Ts is a reference when Ts is the sampling interval.

Advantage of the Invention

According to the aspect of the invention, it is possible to acquire the synchronization circuit and the synchronization method that are flexible and efficient by extracting an influence of distortion of an external communication environment as a control amount, converting the control amount at that time into a state amount with a state space expression format, and executing direct access for feedback. In addition, it is possible to acquire a mathematical modeling of a communication environment and provide a new signal generation model including the environment since the control amount can be acquired as a numerical value to be incorporated into a state space state variable.

BRIEF DESCRIPTION OF THE DRAWINGS

FIG. 8 is a diagram illustrating an example of a classification table of multicarrier signals.

BEST MODE FOR CARRYING OUT THE INVENTION

Figure 1:
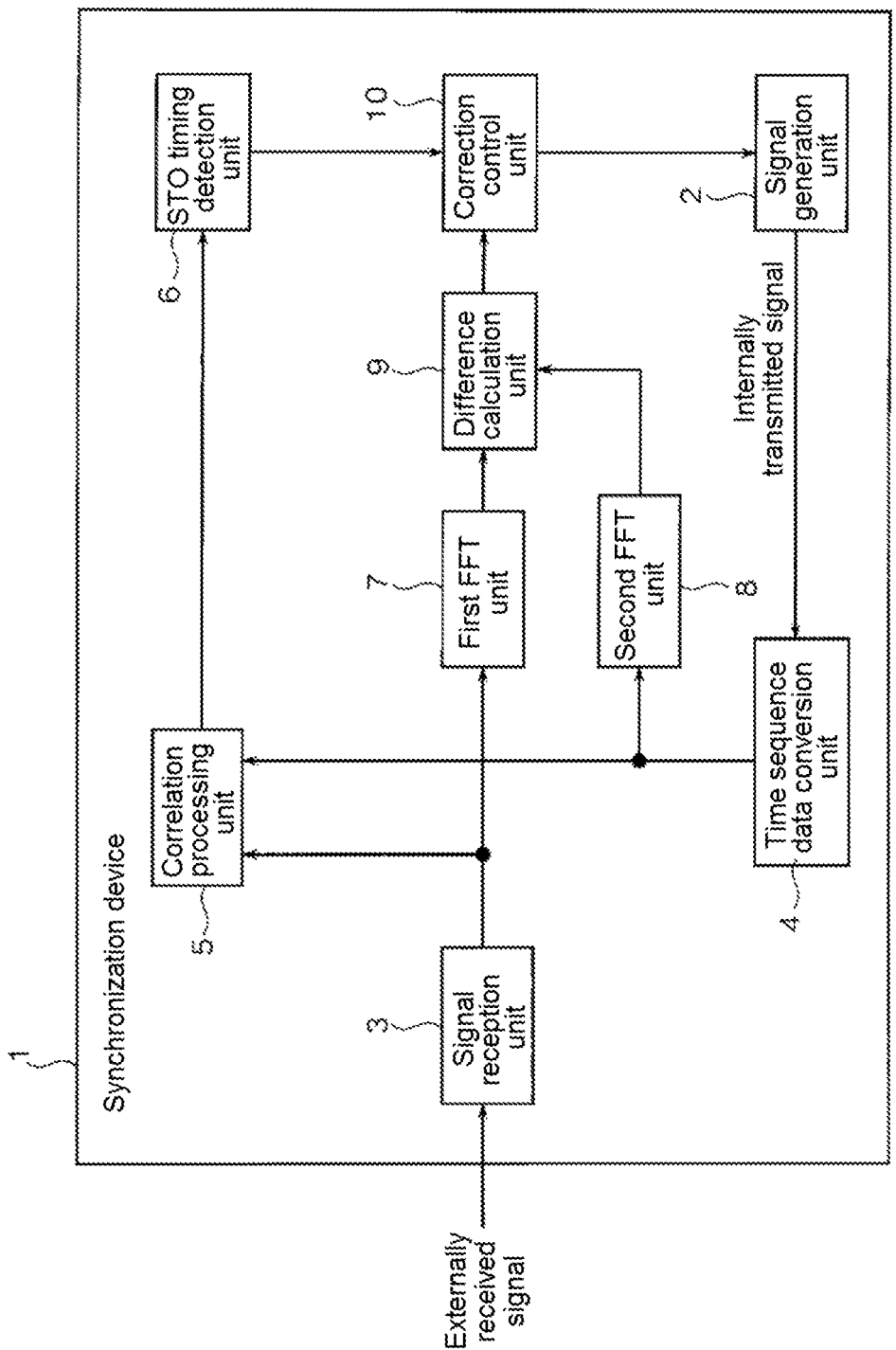
FIG. 1 is a block diagram illustrating an overall configuration of a synchronization device according to the invention.

Hereinafter, embodiments of the invention will be described in detail with reference to the appended drawings.

Object of the Invention

In view of the above-described practical problems, the invention relates to a synchronization circuit that contains signal generation models generating various modulation waves with regard to various OFDM-based modulation schemes expected in 5G and a scheme of setting the signal generation models as plants and achieving synchronization using two control mechanisms in accordance with actual externally received signals, and is based on the idea that control laws are used as externally received signals.

A main object of the invention is to provide a general-purpose reception side synchronization scheme by unifying techniques expected to be used in new radio (NR) and using a general-purpose signal generation model in accordance with a scheme configured in a software defined radio (SDR) manner as a modulation scheme.

Overview of the Invention

In the invention, a signal generation unit that uses a state space description technology capable of configuring software defined radio (SDR) is adopted to a signal generation model to achieve the foregoing objects and handle synchronization of various communication schemes. In a control mechanism, a policy on synchronization is to generate a signal equivalent to an externally received signal in addition to control on the signal generation unit which is a control target using the signal generation unit as a plant and using an externally received signal as a control law. A detected control amount is a correction amount of the externally received signal for synchronization.

Here, since an OFDM-based synchronization is a stream signal formed by a signal sequence, it is important to detect an appropriate position of a symbol. In CP-OFDM, there is a structure for recovering synchronization by CP (transmission efficiency deteriorates while a processing time is shortened). However, even when there is no CP, it is important to achieve synchronization.

Synchronization of an OFDM-based signal is achieved by correcting STO and CFO. Symbol timing offset (STO) is position correction at a transmission timing of a time sequence signal: a time of one symbol: T=1 (subcarrier frequency interval), Ts=T/number of subcarriers: and an interval of resolution of 1 Ts per symbol.

Carrier frequency offset (CFO) is obtained by observing a phase state of a subcarrier and control within 1 Ts is necessary for the CFO. The CFO can be executed through FFT-based demodulation and is obtained through phase rotation of complex number output of FFT.

Further, a CAZAC sequence code which is also used in 3GPP 4G, has strong autocorrelation, and is very excellent in a synchronization correlation process is used as a synchronization code.

More specifically, in the case of an OFDM-based synchronization system, in practice, after transmission from a transmission device in conformity with a predetermined modulation scheme and carrier modulation at a carrier frequency, distortion related to time frequency characteristics is received through a transmission medium and arrives at a reception device. That is, at the time of arrival at the reception device, an influence of a communication environment and a transmission waveform are considered to be received.

Therefore, in a synchronization scheme, preparation of a reception function of responding to a variation in an environment caused due to the communication environment and the transmission waveform is a considerably trustworthy policy. Accordingly, in the synchronization scheme of the invention, when the signal generation unit is prepared as a signal generation model and words of control are used, a format for executing feedforward control on the STO and feedback control on the CFO setting the signal generation unit as a control target is adopted. Since the STO can be configured such that a CFO control amount is fed back to a state variable by executing optimum value searching through correlator calculation, a form in which the signal generation model is contained is a considerable uniform technique.

For example, in the case of the OFDM-based scheme, the signal generation unit serving as a signal generation model by a state space expression can be unified as an expression of $X_k = A_k X_{K-1} + B_k U$ and $Y = C_k X_k + D_k V$ when $A_k$, $B_k$, $C_k$, and $D_k$ are signal generation operators necessary to generate a multicarrier signal and a state variable X in a state variable x is displayed as a vector, U is an input vector indicating an input signal of each subcarrier as a vector, V is a disturbance vector indicating disturbance of each subcarrier as a vector, and Y is an output vector.

Then, in accordance with the state space expression, modulated waves proposed in OFDM-based NR (3GPP or the like) can be classified in a unified manner. The unified expression means that a universal configuration can be realized as in the SDR.

For example, modulation such as UF-OFDM, FBMC, CP-OFDM, and W-OFDM can be classified and expressed in a time sequence k and a combination of system matrices (A, B, C, and D) at k. This has a processing format of $Op*X_k$ by inserting an operator Op (any of $A_k$, $B_k$, $C_k$, and $D_k$) into the state variable $X_k$.

In OFDM-based modulation, a code sequence to be transmitted is mapped in conformity with a designated modulation scheme. For example, a set of (I, Q) signals in 2-dimensional space can be formed according to a modulation scheme (QPSK, QAM, or the like) determined in advance. In the OFDM-based modulation, by mapping this set to a frequency axis, one symbol is formed at a certain time-based time. When this signal is subjected to inverse discrete Fourier transform, a time sequence is transmitted. Then, when information on the frequency axis is set, a subcarrier interval and disposition of the number of subcarriers can be determined. When a physical time interval is given at the time of transmitting a signal, a physical frequency of the subcarrier is naturally determined.

[Configuration of Synchronization Device]

As illustrated in FIG. 1, a synchronization device 1 according to the embodiment schematically includes a signal generation unit 2, a signal reception unit 3, a time sequence data conversion unit 4, a correlation processing unit 5, an STO timing detection unit 6, a first FFT unit 7, a second FFT unit 8, a difference calculation unit 9, and a correction control unit 10. Hereinafter, a configuration of each unit will be described.

Figure 2:
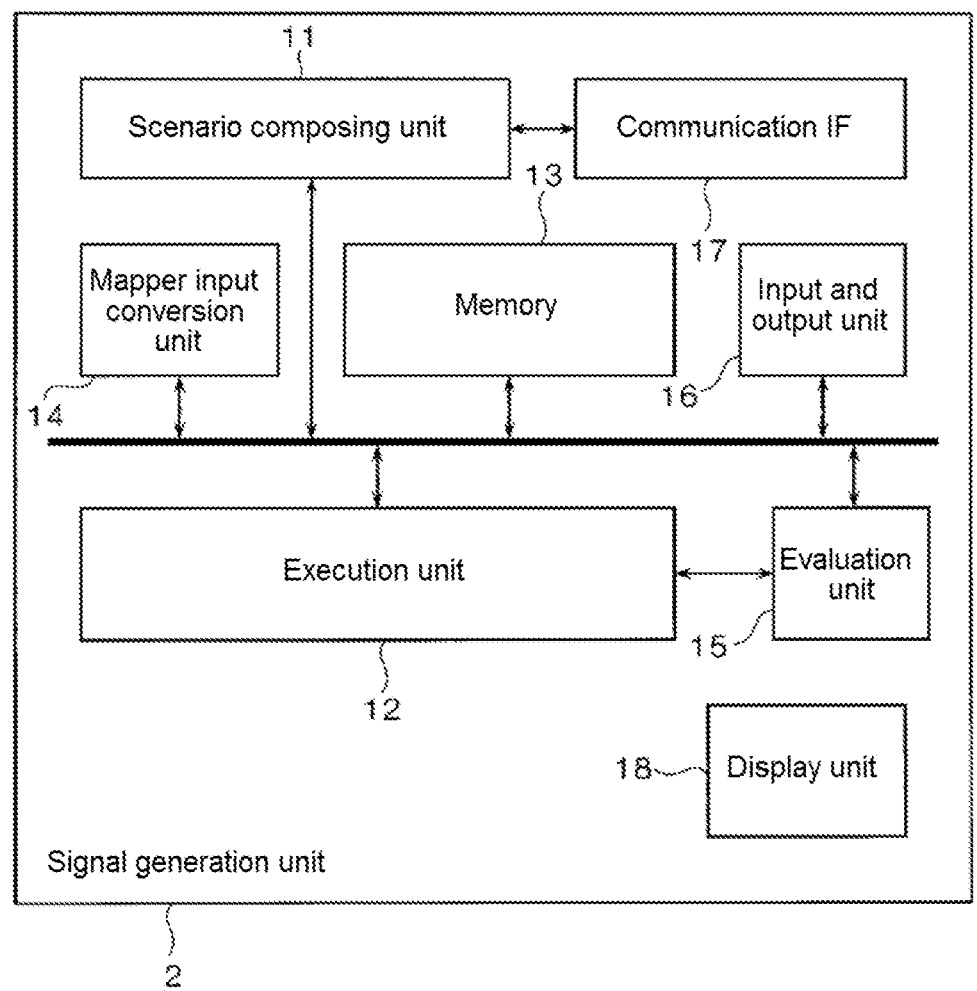
FIG. 2 is a schematic diagram illustrating a configuration of an example of a signal generation unit contained in the synchronization device according to the invention.

First, the signal generation unit 2 serving as a signal generation model by the state space expression will be described with reference to FIG. 2. FIG. 2 illustrates an example of the signal generation unit 2 according to the embodiment. The signal generation unit 2 generates a multicarrier signal in which a synchronization code (a complex number sequence with strong autocorrelation) of the CAZAC sequence is embedded in a predetermined symbol by the same kind of signal as an externally received signal to be described below, includes a CPU that functions as an execution unit 12, and outputs an output signal y formed by a multicarrier signal with respect to an input signal u formed by a code sequence. The signal generation unit 2 includes a memory 13 that stores a state variable or a calculation matrix. The signal generation unit 2 includes an input and output unit 16 and a communication IF 17 that executes remote adjustment.

The input and output unit 16 inputs the input signal u and outputs the output signal y. Each configuration is connected via a data connection bus and a control bus. The input and output unit 16 may have not only a function of inputting and outputting data but also a function of complying with an interface unique to an RF modulation unit, such as a data format, a code, or a sequence.

A signal type of a multicarrier signal is input to the input and output unit 16. The signal type has the same type of externally received signal to be described below. For example, UF-OFDM, CP-OFDM, FBMC, filter OFDM, GFDM, and Windowing-OFDM can be exemplified. Any piece of information necessary to generate a multicarrier signal, such as presence or absence of a synchronization signal, the number of subcarriers, a modulation scheme, and a filtering scheme in accordance with the externally received signal to be described below is input to the input and output unit 16.

The CPU included in the signal generation unit 2 further functions as a scenario composing unit 11. The scenario composing unit 11 composes a scenario at the time of generating a multicarrier signal and controls the execution unit 12 according to the scenario. The execution unit 12 executes arithmetic processing using an operator set by the scenario composing unit 11. The mapper input conversion unit 14 has a function of converting each element of the input signal u formed from a desired code sequence into a pair of (I, Q) signals corresponding to a predetermined modulation scheme.

The input signal u has a portion providing amplitude phase information to be converted into amplitude phase information of a sinusoidal wave (hereinafter referred to as primary modulation). The primary modulation may be a digital signal 1/0 or may not be a signal with a large bandwidth in a rectangular shape such as a 1/0 information. When the input signal u is not the signal with the large bandwidth in the rectangular shape, an occupied bandwidth of the signal can be reduced.

For example, when a 6-bit input signal u is used, conversion on a 2-dimensional map is executed by using 8 kinds of numerical values generated from 3 beginning bits as I and using 8 kinds of subsequently arriving numerical values generated from 3 bits as Q. In this case, 64 mapping points of 8*8 are generated. When the pair of (I, Q) is converted through inverse fast Fourier transform (IFFT) in a functional operation of a mapper, a time sequence in which many sinusoidal waves: subcarriers with amplitude phase information are superimposed occurs. This is an OFDM signal.

The multicarrier signal can be expressed with a matrix in which a frequency is set as a dimension. Accordingly, the input signal u is allocated for each subcarrier, and the input vector U and the output vector Y in which the input signal u and the output signal y are expressed as vectors are shown in Expression (7) below.

[Math. 7]

$$U = \begin{bmatrix} u(0) \\ \vdots \\ u(N-1) \end{bmatrix}$$

$$Y = \begin{bmatrix} y(0) \\ \vdots \\ y(N-1) \end{bmatrix}$$

Expression (7)

Here, i=0, 1, ..., N−1 are subcarriers. Hereinafter, a case in which the number of subcarriers N is mainly 4 will be described to facilitate understanding.

Figure 3:
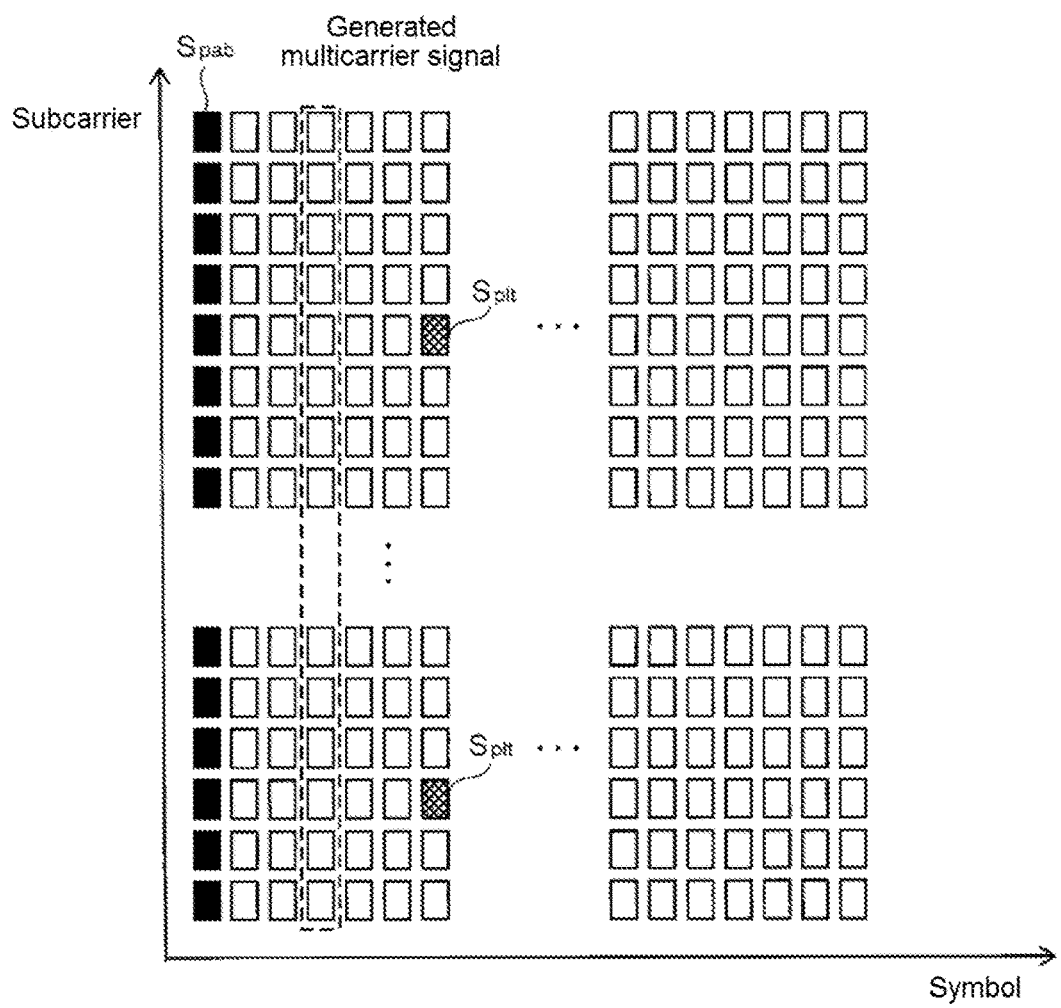
FIG. 3 is a diagram illustrating an example of a multi-carrier signal.

The input vector U is any code sequence formed by 1/0. The scenario composing unit 11 uses the input vector U according to the generated multicarrier signal. FIG. 3 illustrates an example of the multicarrier signal. When the scenario composing unit 11 selects the input vector U, the signal generation unit 2 can generate any multicarrier signal to be used in a filtered multicarrier communication scheme for each symbol. The generated multicarrier signal may be a preamble signal $S_{pab}$, may be a control signal, or may be a payload signal. The payload signal may include a pilot signal $S_{plt}$. The input vector U according to the generated multicarrier signal may be generated using a numerical conversion operator.

When any calculation process executed on the input vector U at the time of generating the multicarrier signal is an operator AR, the calculation process can be expressed as ARU. Since a process is executed in the order of modulation=>frequency multiplexing=>filtering in the filtered multicarrier signal communication scheme, it is necessary to execute a calculation process a plurality of times until the output signal y is generated. Accordingly, the state variable x is used. The state vector X in which the state variable x is expressed as a vector can be expressed in, for example, Expression (8) below.

[Math. 8]

$$X_k = A_k X_{k-1} + B_k U$$

Expression (8)

In Expression (8), $A_k$ is an operator indicating a calculation process to be executed on the state vector X. The operators $A_k$ and $B_k$ function as signal generation operators necessary to generate the multicarrier signal. The signal generation operators are the operators $A_k$ and $B_k$ granting time characteristics, frequency characteristics, or through/zero characteristics specified with a suffix k indicating an order. The operator $B_k$ may be a mapping conversion operator of the input signal vector U.

Expression (8) is a state space expression formula at each time point specified with the suffix k. Here, a state vector $X_0$ of k=0 is a matrix in which elements are all "0" (hereinafter denoted by {0}). By changing the operators $A_k$ and $B_k$ according to a generated signal, it is possible to generate any multicarrier signal. The state vectors $X_k$ are generated sequentially as generation course signals using the operators $A_k$ and $B_k$ and the output vector Y is generated at an appropriate time point of k.

In a signal evaluation test environment stage of the multicarrier communication scheme, it is preferable to grant communication environment characteristics to the multicarrier signal for evaluation. Accordingly, the output vector Y is expressed as in Expression (9) below.

[Math. 9]

$$Y = C_k X_k + D_k V$$

Expression (9)

Here, $C_k$ in Expression (9) is an operator indicating a calculation process to be executed on the state vector, V is a disturbance vector indicating a disturbance v of each subcarrier, and $D_k$ is an operator indicating a calculation process to be executed on the disturbance vector. The operators $C_k$ and $D_k$ function as characteristic addition operation necessary to grant characteristics to the multicarrier signal. The characteristic addition operators are the operators $C_k$ and $D_k$ granting characteristics necessary for transmission path distortion, or signal evaluation, or device evaluation such as through and zero to the generation course signal $X_k$. Thus, it is possible to generate the multicarrier signal to which transmission path characteristics or disturbance is added.

When the transmission path characteristics or the disturbance is not considered, the operator $C_k$ is a unit matrix (hereinafter denoted by {E} or E) and $D_k N$ is {0}. By changing the operators $C_k$ and $D_k$ according to the generated signal, it is possible to generate any multicarrier signal to be evaluated.

Each operator is not determined mathematically, but is determined by input and output design. The scenario composing unit 11 changes the operators to be used by the execution unit 12 according to the generated multicarrier signal. For example, to generate the multicarrier signal, the scenario composing unit 11 changes the operators $A_k$ and $B_k$ in the order of modulation=>frequency multiplexing=>filtering.

For example, operators functioning as signal generation operators can be exemplified below:

$M_M$: an operator mapping the input signal u to symbol points in conformity with a modulation scheme; and $M_T$: an operator executing symbol multiplexing on the time axis.

Any modulation scheme can be used. For example, 16Quadrature Amplitude Modulation (QAM) is used. In the case of a modulation scheme in which one symbol is expressed at a symbol point on rectangular coordinates of I and Q axes, a code sequence of the input signal u can be expressed a pair of u=(uI(i), uQ(i)) (where i=0, 1, 2, ... ) (where i is a code sequence number). Here, I and Q components are separately exemplified on the assumption of a result after the input signal u is converted. Herein, each procedural calculation is executed.

The input vector U is expressed as in Expression (10) below, for example. The right side of Expression (10) can be converted as in Expression (11).

[Math. 10]

$$U = \begin{bmatrix} u_I(0) + ju_Q(0) \\ u_I(1) + ju_Q(1) \\ u_I(2) + ju_Q(2) \\ u_I(3) + ju_Q(3) \end{bmatrix} \equiv \begin{bmatrix} u_I(0) & u_Q(0) \\ u_I(1) & u_Q(1) \\ u_I(2) & u_Q(2) \\ u_I(3) & u_Q(3) \end{bmatrix} \quad \text{Expression (10)}$$

[Math. 11]

$$\begin{bmatrix} u_I(0) & u_Q(0) \\ u_I(1) & u_Q(1) \\ u_I(2) & u_Q(2) \\ u_I(3) & u_Q(3) \end{bmatrix} \begin{bmatrix} 1 & 1 & 1 & 1 \\ j & j & j & j \end{bmatrix} = \begin{bmatrix} u_I(0) + ju_Q(0) \\ u_I(1) + ju_Q(1) \\ u_I(2) + ju_Q(2) \\ u_I(3) + ju_Q(3) \end{bmatrix} \quad \text{Expression (11)}$$

The operator $M_M$ is expressed in Expression (12), for example.

[Math. 12]

$$M_M = \mathrm{diag}[\, b_0 \ b_1 \ b_2 \ b_3 \,] = \begin{bmatrix} b_0 & 0 & 0 & 0 \\ 0 & b_1 & 0 & 0 \\ 0 & 0 & b_2 & 0 \\ 0 & 0 & 0 & b_3 \end{bmatrix} \quad \text{Expression (12)}$$

The procedural calculation of Expression (12) accords with a multiplication operation of a normal matrix and $b_0$ operates to $u_I(0)$ and $u_Q(0)$. At this time, $(u_I, u_Q)$ values are allocated to (I, Q) numerical values according to the modulation scheme as in Expression (13) below. The allocation order is illustrated in FIG. 3.

[Math. 13]

$$\begin{bmatrix} b_0 & 0 & 0 & 0 \\ 0 & b_1 & 0 & 0 \\ 0 & 0 & b_2 & 0 \\ 0 & 0 & 0 & b_3 \end{bmatrix} U = \begin{bmatrix} U_I(0) + jU_Q(0) \\ U_I(1) + jU_Q(1) \\ U_I(2) + jU_Q(2) \\ U_I(3) + jU_Q(3) \end{bmatrix} \quad \text{Expression (13)}$$

By deriving $U_I(i)+jU_Q(i)$, an input signal $u(i)$ can be mapped to a symbol point for each subcarrier i. By determining b forming the operator $M_M$ for each modulation scheme, it is possible to derive a value of $U(i)=U_I(i)+jU_Q(i)$ corresponding to any modulation scheme. Therefore, each input signal u included in the input vector U can be mapped in conformity with any modulation scheme.

Figures 4, 5:
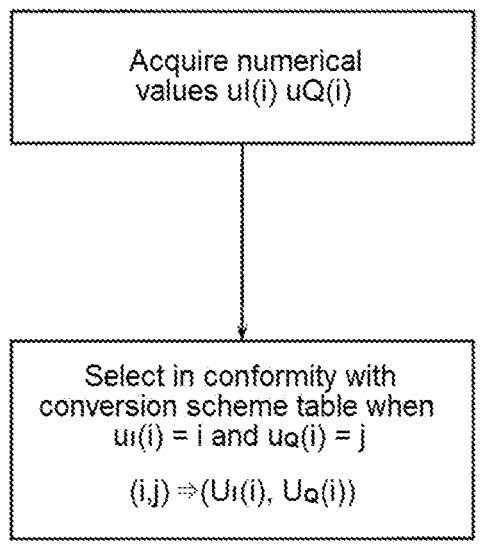
FIG. 4 is a diagram illustrating an example of an allocation order.
FIG. 5 is a diagram illustrating an example of an input vector.

For example, when the modulation scheme 16QAM and an input vector U are denoted by $p_{ij}$, $b_{ij}$ is a table illustrated in FIG. 5. The parenthesis in the drawing indicates a (I, Q) component. A target modulation scheme is BPSK, QPSK, Mary-QAM, or Offset QAM.

The operator $M_T$ is expressed in Expression (14), for example.

[Math. 14]

$$X_I = M_T X_{k-1} = \begin{bmatrix} 1 & 0 & \cdots & 0 \\ 0 & 1 & & 0 \\ \vdots & & \ddots & \vdots \\ 0 & 0 & \cdots & 1 \end{bmatrix} \begin{bmatrix} x_{k-1}(0) \\ x_{k-1}(1) \\ x_{k-1}(2) \\ x_{k-1}(3) \end{bmatrix} \quad \text{Expression (14)}$$

The operators functioning as the signal generation operators can be exemplified below, for example:

$T_{iFFT}$: an operator executing an inverse fast Fourier transform;

$T_{iDFT}$ an operator executing an inverse discrete time Fourier transform;

$T_{FFT}$ an operator executing fast Fourier transform; and $T_{DFT}$ is an operator executing discrete time Fourier transform.

The inverse discrete time Fourier transform and the Fourier transform are expressed in Expressions (15) and (16) below, respectively.

[Math. 15]

$$\left. \begin{aligned} f(n) &\equiv 1/N \sum_{k=1}^{N-1} F(k) W^{-nk} (n = 1, 2, \ldots, N-1) \\ W &= e^{-j2\pi/N} \end{aligned} \right\} \quad \text{Expression (15)}$$

[Math. 16]

$$F(k) = \sum_{n=0}^{N-1} f(n) W^{nk} (k = 0, 1, \ldots, N-1) \quad \text{Expression (16)}$$

Here, $W=\exp(-j2\pi/N)$ is called a twiddle factor. N is a total number of conversion elements and n and k are interpreted as variables corresponding to a time sequence and a frequency sequence, respectively. The discrete sampling time is normalized to 1.

The operator $T_{FFT}$ is expressed in Expression (17) below, for example. The operator $T_{FFT}$ indicates a case in which N=4. In addition, w is a twiddle factor.

[Math. 17]

$$X_k = T_{OFT} X_{k-1} = \begin{bmatrix} w^0 & w^0 & w^0 & w^0 \\ w^0 & w^1 & w^2 & w^3 \\ w^0 & w^2 & w^4 & w^6 \\ w^0 & w^3 & w^6 & w^9 \end{bmatrix} \begin{bmatrix} x_{k-1}(0) \\ x_{k-1}(1) \\ x_{k-1}(2) \\ x_{k-1}(3) \end{bmatrix} \quad \text{Expression (17)}$$

The operator $T_{iDFT}$ executing the inverse discrete time Fourier transform is expressed in Expression (18) below. The operator $T_{iDFT}$ indicates a case in which N=4.

[Math. 18]

$$X_k = T_{iDFT} X_{k-1} = 1/4 \begin{bmatrix} w^0 & w^0 & w^0 & w^0 \\ w^0 & w^{-1} & w^{-2} & w^{-3} \\ w^0 & w^{-2} & w^{-4} & w^{-6} \\ w^0 & w^{-3} & w^{-6} & w^{-9} \end{bmatrix} \begin{bmatrix} x_{k-1}(0) \\ x_{k-1}(1) \\ x_{k-1}(2) \\ x_{k-1}(3) \end{bmatrix} \quad \text{Expression (18)}$$

The operator $T_{FFT}$ can be used with a relation with of an inverse matrix $T_{iFFT}^{-1}$ of $T_{iFFT}$ and the operator $T_{iDFT}$ can be used with a relation with of an inverse matrix $T_{DFT}^{-1}$ of $T_{DFT}$.

The operators functioning as the signal generation operators can be exemplified below, for example. By using such filters, it is possible to correspond to a reduction in out-of-band (OOB) or a filtered scheme:

$F_U$: an operator executing a filtering process in a frequency domain for each subcarrier;

$F_P$: an operator executing a filtering process on a time sequence format signal of a plurality of subcarriers;

$F_{PR}$: an operator executing a cyclic convolution filtering process;

$F_{PPN}$: an operator executing a filtering process with a poly-phase format on a plurality of subcarriers;

$F_{DET}$: an operator executing a process of changing an output timing for each piece of filtering data and aligning the output timing in a time transmission direction; and $F_C$ is an operator executing frequency characteristic correction of filtering.

$F_\beta$ is a coefficient operator necessary for preprocessing and is a coefficient complex multiplication arriving at the front stage of iFFT. $F_\beta$ has an equivalent configuration to $F_C$. $\beta$ is a suffix of F.

The operator $F_U$ is a filtering operator in the frequency domain and is expressed in Expression (19) below, for example.

[Math. 19]

$$X_k = F_U X_{k-1} = \begin{bmatrix} fu_0 & 0 & 0 & 0 \\ 0 & fu_1 & 0 & 0 \\ 0 & 0 & fu_2 & 0 \\ 0 & 0 & 0 & fu_3 \end{bmatrix} \begin{bmatrix} x_{k-1}(0) \\ x_{k-1}(1) \\ x_{k-1}(2) \\ x_{k-1}(3) \end{bmatrix} \quad \text{Expression (19)}$$

Here, $f_U$ is a complex number and frequency phase characteristics of the subcarrier are granted and filtering is executed. $f_U$ indicates a frequency response of a filter.

On the other hand, when an impulse response of the filter in the time domain is g(i) and a filter with M taps is included in a discrete time, an output after the filtering is expressed in a discrete domain by a convolution sum of Expression (20) below.

[Math. 20]

$$X_k = F_P X_{k-1} = \sum_{m=0}^{M-1} x_{k-1}(m) g(i-m) \quad \text{Expression (20)}$$

Here, m=0, 1, 2, . . . , M−1, i of $x_{k-1}$ (i) is i=0, 1, 2, . . . , N−1, and j of $X_k$(j) is j=0, . . . , M+N−2.

For example, when M=3 and i=0, 1, and 2, outputs $x_k$(0), $x_k$(1), and $x_k$(2) are as follows.

$x_k(0)=x_{k-1}(0)g(0)$ $x_k(1)=x_{k-1}(0)g(1)+x_{k-1}(1)g(0)$ $C_k(2)=x_{k-1}(0)g(2)+x_{k-1}(1)g(1)+x_{k-1}(2)g(0)$ [Math. 21]

Figure 6:
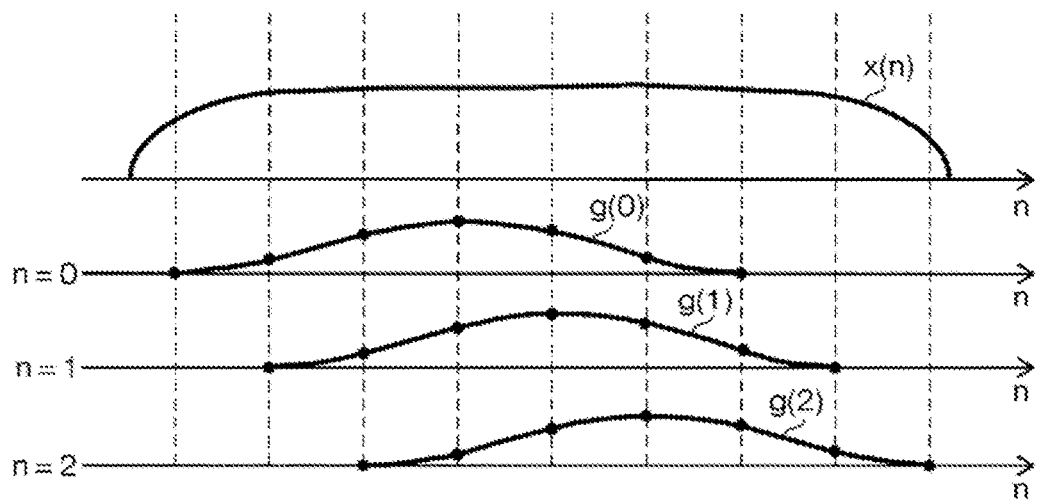
FIG. 6 is a diagram illustrating examples of a state variable and impulse responses.

At this time, examples of the state variable $x_2$(i) and the impulse response g(i) are illustrated in FIG. 6.

For example, when a case in which a tap length of the g(i) filter is 3 is exemplified, the operator $F_P$ is expressed in Expression (22) below.

[Math. 22]

$$X_k = F_P X_{k-1} = \begin{bmatrix} g(0) & 0 & 0 & 0 \\ g(1) & g(0) & 0 & 0 \\ g(2) & g(1) & g(0) & 0 \\ 0 & g(2) & g(1) & g(0) \\ 0 & 0 & g(2) & g(1) \\ 0 & 0 & 0 & g(2) \end{bmatrix} \begin{bmatrix} x_{k-1}(0) \\ x_{k-1}(1) \\ x_{k-1}(2) \\ x_{k-1}(3) \end{bmatrix} \quad \text{Expression (22)}$$

The operator $F_{PR}$ executing cyclic convolution on the filtering in the time domain is expressed in Expression (23), for example. Here, g(i) is an impulse response of the filter, i of $x_{k-1}$ (i) is i=0, 1, 2, . . . , N−1, and j of $X_k$(j) is j=0, . . . , n, n=N.

[Math. 23]

$$X_k = F_{PR} X_{k-1} = \begin{bmatrix} g(0) & g(1) & g(2) & g(3) \\ g(1) & g(2) & g(3) & g(4) \\ g(2) & g(3) & g(4) & g(5) \\ \vdots & \vdots & \vdots & \vdots \\ g(n-1) & g(n) & g(0) & g(1) \\ g(n) & g(0) & g(1) & g(2) \end{bmatrix} \begin{bmatrix} x_{k-1}(0) \\ x_{k-1}(1) \\ x_{k-1}(2) \\ x_{k-1}(3) \end{bmatrix} \quad \text{Expression (23)}$$

The operator $F_{PPN}$ has a role of a poly-phase filter for time sequence data in Expression (24) below.

[Math. 24]

$$X_k = F_{PPN} X_{k-1} = \begin{bmatrix} pp_0(Z^M) & 0 & 0 & 0 \\ 0 & pp_0(Z^M) & 0 & 0 \\ 0 & 0 & pp_0(Z^M) & 0 \\ 0 & 0 & 0 & pp_0(Z_M) \end{bmatrix} \begin{bmatrix} x_{k-1}(0) \\ x_{k-1}(1) \\ x_{k-1}(2) \\ x_{k-1}(3) \end{bmatrix} \quad \text{Expression (24)}$$

$pp_i(Z^M)$ is an operator formed by delay operators and is configured as in Expression (25) below. In Expression (25), a case of a poly-phase configuration when a filter length having the impulse coefficient g at M=4 and K=4 is KM=16 is expressed. $z^{-M}$ in $x_{k-1}$ is a delay operator and indicates that data after M timing is used.

[Math. 25]

$$pp_i(Z^M)g(i)+g(i+M)z^{-M}g+(i+2M)z^{-2M}+g(i+3M)z^{-M} \quad \text{Expression (25)}$$

At in K=4, K has a relation of Expression (26) below.

[Math. 26]

$$pp_i(Z^M) = \sum_{q=1}^{K} g(i+(q-1)M)z^{-(q-1)M} \quad \text{Expression (26)}$$

Here, q=1 to K.

The operator FDET is expressed in Expression (27) below, for example.

[Math. 27]

$$X_k = F_{DET}X_{k-1} = \begin{bmatrix} 1 & z^{-1} & z^{-2} & z^{-3} \end{bmatrix} \begin{bmatrix} x_{k-1}(0) \\ x_{k-1}(1) \\ x_{k-1}(2) \\ x_{k-1}(3) \end{bmatrix} \quad \text{Expression (27)}$$

Here, $z^{-1}$ is a delayer operator. Data is aligned in a time sequence in the delay unit.

The operator $F_C$ is an operator for frequency amplitude phase correction through a filtering process and is expressed in Expression (28) below, for example. fc is a complex number indicating inverse characteristics of a filter for each subcarrier.

[Math. 28]

$$X_k = F_C X_{k-1} = \begin{bmatrix} fc_0 & 0 & 0 & 0 \\ 0 & fc_1 & 0 & 0 \\ 0 & 0 & fc_2 & 0 \\ 0 & 0 & 0 & fc_3 \end{bmatrix} \begin{bmatrix} x_{k-1}(0) \\ x_{k-1}(1) \\ x_{k-1}(2) \\ x_{k-1}(3) \end{bmatrix} \quad \text{Expression (28)}$$

The operator $F_\beta$ is expressed in Expression (29) below, for example. The operator $F_\beta$ is used when an adjustment coefficient is multiplied for each subcarrier as preprocessing. $\beta$ is a complex number.

[Math. 29]

$$X_k = F_\beta X_{k-1} = \begin{bmatrix} \beta_0 & 0 & 0 & 0 \\ 0 & \beta_1 & 0 & 0 \\ 0 & 0 & \beta_2 & 0 \\ 0 & 0 & 0 & \beta_3 \end{bmatrix} \begin{bmatrix} x_{k-1}(0) \\ x_{k-1}(1) \\ x_{k-1}(2) \\ x_{k-1}(3) \end{bmatrix} \quad \text{Expression (29)}$$

Operators functioning as a signal generation operator can be exemplified below, for example:

$S_{CP}$: an operator executing addition of a cyclic prefix (CP) for synchronization and is executed after filtering; and $S_{win}$: an operator executing a windowing process on data.

The operator $S_{CP}$ is expressed in Expression (30) and (31), for example, when the number of CPs is 2.

[Math. 30]

$$X_k = S_{CP}X_{k-1} = \begin{bmatrix} 0 & 0 & 1 & 0 \\ 0 & 0 & 0 & 1 \\ 1 & 0 & 0 & 0 \\ 0 & 1 & 0 & 0 \\ 0 & 0 & 1 & 0 \\ 0 & 0 & 0 & 1 \end{bmatrix} \begin{bmatrix} x_{k-1}(0) \\ x_{k-1}(1) \\ x_{k-1}(2) \\ x_{k-1}(3) \end{bmatrix} = \begin{bmatrix} x_{k-1}(2) \\ x_{k-1}(3) \\ x_{k-1}(0) \\ x_{k-1}(1) \\ x_{k-1}(2) \\ x_{k-1}(3) \end{bmatrix} \quad \text{Expression (30)}$$

[Math. 31]

$$X_k = \\ S_{WIN}X_{k-1} = \begin{bmatrix} win(0) & win(1) & win(2) & win(3) \end{bmatrix} \begin{bmatrix} x_{k-1}(0) \\ x_{k-1}(1) \\ x_{k-1}(2) \\ x_{k-1}(3) \end{bmatrix} \quad \text{Expression (31)}$$

Operators functioning as characteristic addition operators can be exemplified below, for example:

$S_T$: an operator adding distortion of a transmission path; and $S_{CFO}$ is an operator that executes addition of a carrier frequency offset (CFO); and $S_N$: an operator executing addition of noise.

The operator $S_T$ is expressed in Expression (32) below, for example. st is a complex number indicating distortion of a transmission path. $S_T$ can be applied to either a time sequence or a frequency sequence.

[Math. 32]

$$CX_k = S_T X_k = \begin{bmatrix} st_{00} & st_{01} & st_{02} & st_{03} \\ st_{10} & st_{11} & st_{12} & st_{13} \\ st_{20} & st_{21} & st_{22} & st_{23} \\ st_{30} & st_{31} & st_{32} & st_{33} \end{bmatrix} \begin{bmatrix} x_k(0) \\ x_k(1) \\ x_k(2) \\ x_k(3) \end{bmatrix} \quad \text{Expression (32)}$$

The operator $S_{CFO}$ is expressed in Expression (33) below, for example. cfo is a complex number indicating frequency shift. $S_{CFO}$ can be applied to either a time sequence or a frequency sequence.

[Math. 33]

$$CX_k = S_{CFO}X_k = \begin{bmatrix} cfo_0 & 0 & 0 & 0 \\ 0 & cfo_1 & 0 & 0 \\ 0 & 0 & cfo_2 & 0 \\ 0 & 0 & 0 & cfo_3 \end{bmatrix} \begin{bmatrix} x_k(0) \\ x_k(1) \\ x_k(2) \\ x_k(3) \end{bmatrix} \quad \text{Expression (33)}$$

The operator $S_N$ is expressed in Expression (34) below, for example. This assumes a model in which an independent noise sequence v is superimposed by granting amplitude phase characteristics at sn for each subcarrier. $S_N$ can be applied to either a time sequence or a frequency sequence.

[Math. 34]

$$DV = S_N V = \begin{bmatrix} sn_0 & 0 & 0 & 0 \\ 0 & sn_1 & 0 & 0 \\ 0 & 0 & sn_2 & 0 \\ 0 & 0 & 0 & sn_3 \end{bmatrix} \begin{bmatrix} v(0) \\ v(1) \\ v(2) \\ v(3) \end{bmatrix} \quad \text{Expression (34)}$$

The signal generation unit 2 can flexibly change presence or absence of a synchronization signal, a kind of signal, the number of subcarriers, a modulation scheme, and a filtering scheme by combining the operators $A_k$, $B_k$, $C_k$, and $D_k$. Therefore, the signal generation unit 2 can generate various multicarrier signals with a simple configuration.

First Embodiment

In the embodiment, an example in which the signal generation unit 2 generates a multicarrier signal will be described. The scenario composing unit 11 sets an order of calculation and the operators $A_k$ and $B_k$. When a UF-OFDM signal is generated as the multicarrier signal, the scenario composing unit 11 sets $A_1=\{0\}$, $B_1=M_M$, $A_2=T_{iFFT}$, $B_2=\{0\}$, $A_3=F_P$, $B_3=\{0\}$ as the operators $A_k$ and $B_k$. In the embodiment, a case in which a modulation scheme of the operator $M_M$ is the 16QAM modulation scheme will be described.

• Initial Stage

The scenario composing unit 11 inputs the input vector U to the execution unit 12. Since the modulation scheme according to the embodiment is the 16QAM modulation scheme, the scenario composing unit 11 inputs the input vector U expressed in Expression (10) to the execution unit 12.

$k=1$

The scenario composing unit 11 designates $A_1=\{0\}$ and $B_1=M_M$. Since the modulation scheme according to the embodiment is the 16QAM modulation scheme, the scenario composing unit 11 inputs the operator $M_M$ in which the number of symbol points is 16 to the execution unit 12. The execution unit 12 functions as an execution unit and derives the state vector $X_1=M_M U$ using this operators by calculating Expression (8).

$k=2$

The scenario composing unit 11 designates $A_2=T_{iFFT}$ and $B_2=\{0\}$. The execution unit 12 functions as an execution unit and derives the state vector $X_2$ by calculating $X_2=T_{iFFT}*X_1=T_{iFFT}*(M_M U)$ using the operators.

Since the operator $T_{iFFT}$ is applied, the state vector $X_2$ is a vector signal sequence which is the multicarriers. Here, a constant coefficient in calculation of inverse Fourier transform may be multiplied.

$k=3$

The scenario composing unit 11 designates $A_3=F_P$ and $B_3=\{0\}$. The execution unit 12 functions as an execution unit and derives the state vector $X_3$ by calculating $X_3=F_P*X_2=Fp*T_{iFFT}*(M_M U)$ using the operators.

Since the operator $F_P$ is applied, the state vector $X_3$ is a vector signal sequence which is filtered multicarriers. At this time point, one symbol of a UF-OFDM signal is accomplished.

$k=4$

The scenario composing unit 11 designates $C_4=\{E\}$ and $D_4=\{0\}$. The execution unit 12 functions as an execution unit and derives the output vector Y by calculating $Y=EX_3$ using the operators.

Amplitude phase distortion of a filter by the operator $F_P$ is corrected in some cases. In this case, before k=2, the operator $F_C$ is executed as the operator $A_2$. In this case, the state vectors $X_2$ to $X_4$ are as follows.

$$X_2=F_C*X_1=T_{iFFT}*(M_M U)$$

$$X_3=T_{iFFT}*X_2=T_{iFFT}*F_C*(M_M U)$$

$$X_4=F_P*X_3=*T_{iFFT}F_C(M_M U)$$

$$Y=EX_4$$

Here, despite correction of frequency characteristics, $F_P*T_{iFFT}*E$ (where E is a unit matrix) is generated and a frequency distortion value of each subcarrier can be calculated by $T_{FFT}(F_P*T_{iDFT}*E)$. When an element of $F_U$ expressed in Expression (19) is input using a reciprocal of this value and a corrected value, a correction process is finished and the calculation can be executed inside the system. A corrected value obtained from a numerical value calculated using an observation equation to be mentioned in a third embodiment below in a transmission scenario may be fed back to the parameter of F.

For example, an output is obtained with $Y=E*F_P*E$, a corrected value is obtained on the basis of a complex number obtained for each of the obtained subcarriers obtained with $T_{FFT}(Y)$, and the corrected value is substituted into an element of each subcarrier of $F_U$ so that $F_U$ can be formed.

In this way, a UF-OFDM signal or a CP-OFDM signal can be generated by combining the operations in the order set in the scenario composing unit 11. For example, a signal in conformity with a scheme disclosed in non-patent documents, such as CP-OFDM, Generalized Frequency Division Multiplexing (GFDM), and Filter Bank MultiCarrier (FBMC) can be generated using the following operators.

In the case of CP-OFDM, $B_1=M_M$, $A_2=Ti_{FFT}$, $A_3=S_{CP}$, and $A_1=B_2=B_3=\{0\}$ are used.

In the case of Windowing-OFDM, $B_1=M_M$, $A_2=Ti_{FFT}$, $A_3=S_{CP}$, $A_4=S_{WIN}$, and $A_1=B_2=B_3=\{0\}$ are used.

In the case of GFDM, $B_1=M_M$, $A_2=M_T$, $A_3=F_{PR}$, $A_4=A_5=S_{CP}$, and $A_1=B_2=B_3=\{0\}$ are used.

In the case of FBMC in which filtering in a frequency domain is executed, $B_1=M_M$, $A_2=F_U$, $A_3=Ti_{FFT}$, and $A_1=B_2=B_3=\{0\}$ are used.

In the case of FBMC in which filtering in a time domain is executed, $B_1=M_M$, $A_2=F_\beta$, $A_3=Ti_{FFT}$, $A_4=F_{PPM}$, $A_5=F_{DET}$, and $A_1=B_2=B_3=\{0\}$ are used.

As described above, the signal generation unit 2 according to the embodiment can construct the multicarrier signal of each scheme using a combination of the operators.

Second Embodiment

In the embodiment, an example in which a multicarrier signal with characteristics changed by the signal generation unit 2 is generated will be described. When the multicarrier signal with changed characteristics is generated, the scenario composing unit 11 further sets the operators $C_k$ and $D_k$ and an order of calculation in addition to the operators $A_k$ and $B_k$. The scenario composing unit 11 sets, for example, $C_k=S_T$ and $D_k S_N$.

When the scenario composing unit 11 sets $C_k=S_T$ and $D_k=S_N$, the scenario composing unit 11 inputs the operators $C_k=S_T$ and $D_k=S_N$ and the disturbance vector V in k=4 described in the first embodiment to the execution unit 12. The output vector Y is derived by calculating $Y=S_T X_3+S_N V$ using the operators.

When CFO is further added in addition to distortion of a transmission path, the scenario composing unit 11 inputs the operators $C_1=S_{CFO}$, $C_2=S_T$, and $D_4=A_N$ and the disturbance vector V to the execution unit 12 in k=4 described in the first embodiment. In this case, the output vector $Y=S_T S_{CFO} X_3+A_N V$ is formed.

In this way, by setting the operators $C_k$ and $D_k$ and the disturbance vector V, it is possible to generate the multicarrier signal to which characteristics of the transmission path or disturbance are added.

Third Embodiment

In the embodiment, the CPU included in the signal generation unit 2 further functions as an evaluation unit 15. The evaluation unit 15 evaluates a multicarrier signal. When the multicarrier signal is evaluated, the scenario composing unit 11 sets an operator G which is a signal analysis operator used to evaluate the multicarrier signal and an order of calculation.

• Initial Stage

The scenario composing unit 11 inputs the multicarrier signal as a reception vector R to the evaluation unit 15. At this time, the scenario composing unit 11 sets the operator $T_{FFT}$ to convert the multicarrier signal into a sequence signal in a frequency domain. The evaluation unit 15 calculates $T_{FFT}*R$.

$k=1$

The scenario composing unit 11 designates the operator G in the evaluation unit 15. The evaluation unit 15 calculates $G*(T_{FFT}*R)$.

For example, the following operators can be exemplified as the operator G:

$G_{CCDF}$: an operator executing a complementary cumulative distribution function (CCDF) process. Thus, an amplitude probability distribution of a received signal can be formed. CCDF is equivalent to peak to average power ratio (PAPR) evaluation; and $G_{CS}$: an operator executing a constellation process. The constellation process includes an average, dispersion, an error vector magnitude (EVM) for each subcarrier. The constellation process can also be applied for each constellation (a signal point of a signal space diagram).

When $f_{CDF}$ is an amplitude probability distribution (CDF: Cumulative Distribution Function), CCDF is obtained by $f_{CCDF}=1-f_{CDF}$. When $F_{CDF}$ is vector representation of $f_{CCDF}$ of each carrier, the operator $G_{CCDF}$ is expressed in Expression (35) below, for example. In addition, j of the $f_{CCDF}$ operator indicates an amplitude probability distribution with a level up to j. By detecting a location of a level interval at which the reception level is determined in advance and increasing COUNT in which the detected level is determined in advance by +1, a frequency is obtained. By cumulating COUNT from the high level, an amplitude distribution is obtained.

[Math. 35]

$$G_{CCDF}R = (1 - F_{CDF})R = \begin{bmatrix} f_{CCDF}(0,j) & 0 & 0 & 0 \\ 0 & f_{CCDF}(1,j) & 0 & 0 \\ 0 & 0 & f_{CCDF}(2,j) & 0 \\ 0 & 0 & 0 & f_{CCDF}(3,j) \end{bmatrix} \begin{bmatrix} r_k(0) \\ r_k(1) \\ r_k(2) \\ r_k(3) \end{bmatrix}$$

Expression (35)

$f_{CCDF}$ conforms as follows. Here, z is a time advance operator, k is the number of pieces of data, j is an index of an amplitude level, and Lj is an amplitude level.

At Initialization, $count(j)=0 (j=0,1,2 \ldots, J-1)$ $f_{CCDF}(m,j)=1/J\Sigma_{i=0}^{j} count(L_i)$, provided that for any $k,j (0 \le k \le K-1, 0 \le j \le J-1)$ $0\,dB \le L_j (L_j - L_{j+1} = 0.01) \le 100\,dB$ $\{count(L_j) = count(L_j)+1 | \text{satisfied by} \\ L_{j+1} \le 10\log_{10}|z^{-k}r_k(m)| < L_j\}$ [Math. 36]

The operator $G_{CS}$ is expressed in Expression (37) below, for example. The subscript k assumes that the reception vector arrives at a time sequence.

[Math. 37]

$$G_{CS}R = \begin{bmatrix} cs_0 & 0 & 0 & 0 \\ 0 & cs_1 & 0 & 0 \\ 0 & 0 & cs_2 & 0 \\ 0 & 0 & 0 & cs_3 \end{bmatrix} \begin{bmatrix} r_k(0) \\ r_k(1) \\ r_k(2) \\ r_k(3) \end{bmatrix}$$

Expression (37)

In the constellation process, when an average of each subcarrier is obtained, for example, calculation of Expression (38) below is executed.

[Math. 38]

$$G_{CS}R = \begin{bmatrix} 1/K\sum_{k=0}^{K-1}z^{-k} & 0 & 0 & 0 \\ 0 & 1/K\sum_{k=0}^{K-1}z^{-k} & 0 & 0 \\ 0 & 0 & 1/K\sum_{k=0}^{K-1}z^{-k} & 0 \\ 0 & 0 & 0 & 1/K\sum_{k=0}^{K-1}z^{-k} \end{bmatrix} \begin{bmatrix} r_k(0) \\ r_k(1) \\ r_k(2) \\ r_k(3) \end{bmatrix}$$

Expression (38)

In the constellation process, when EVM of each subcarrier is obtained, for example, the following calculation is executed.

[Math. 39]

$$G_{CS}R = \begin{bmatrix} Evm(0) & 0 & 0 & 0 \\ 0 & Evm(1) & 0 & 0 \\ 0 & 0 & Evm(2) & 0 \\ 0 & 0 & 0 & Evm(3) \end{bmatrix} \begin{bmatrix} r_k(0) \\ r_k(1) \\ r_k(2) \\ r_k(3) \end{bmatrix}$$

$$Evm(j) = 100\sqrt{\frac{1/K\sum_{k=0}^{K-1}((I_k - z^{-k}\text{real}(r_k(j)))^2 + (Q_k - z^{-k}\text{imag}(r_k(j)))^2)}{1/K\sum_{k=0}^{K-1}((I_k)^2 + (Q_k)^2)}}$$

Here, $I_k$ and $Q_k$ indicate reference values determined in advance.

By changing internal parameters of the operators of the state vector X on the basis of the evaluation values, it is possible to acquire desired parameters. By performing feedback from a result of the evaluation, it is possible to update an operator function of the system, including the feedback value and the beforehand corresponding internal parameters of the operators. Thus, it is possible to update content appropriate for the real system.

In view of $Y = L(M_M U)$, L is obtained. For example, when L has a regular nature in $F_{PP}*T_{iDFT}*F_U$ or the like, an inverse matrix can be calculated and $M_M U$ can be obtained as $M_M U=L^{-1}Y$ can be obtained. When L has no regular nature, a pseudo-inverse matrix can also be calculated and obtained.

As described above, the calculation can be executed for each symbol. The invention can also be applied to a plurality of symbols. In this case, it is possible to realize the application by increasing a state variable matrix in a column direction.

As a configuring method similar to the increase operation, there is a configuration method for channel multiplexing by division in one symbol. A vector of the state variable $X_k$ is a state in which a code sequence is mapped to complex numbers. In an OFDM signal, the vector is normally disposed on a frequency axis. An example of a configuration in which an information unit such as a channel is divided and multiplexed signals with different signal configurations or schemes for each channel are generated to realize generation of various signals is illustrated in FIG. 7.

Figure 7:
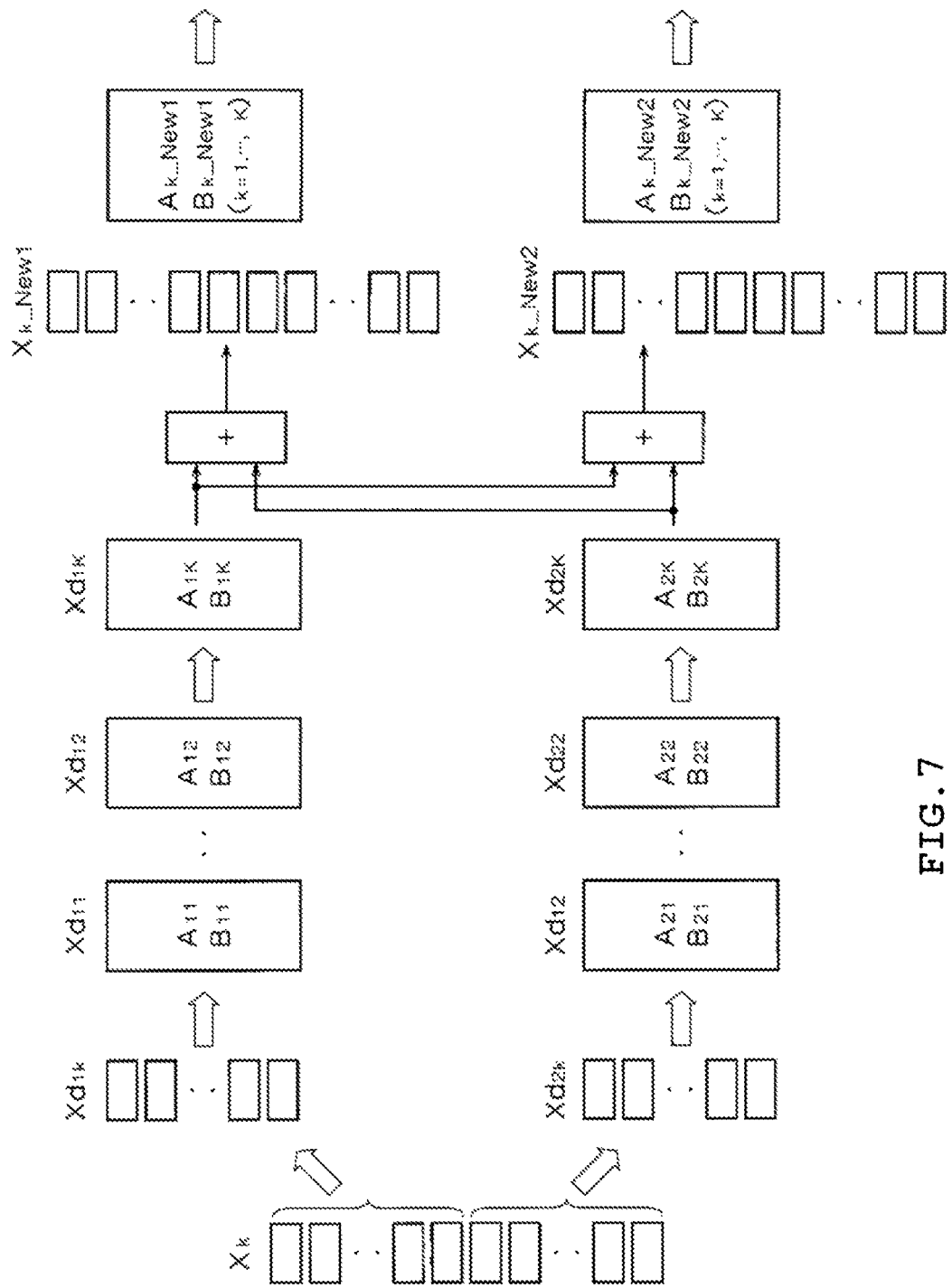
FIG. 7 is a schematic diagram illustrating channel multiplexing by division in one symbol.

For example, as illustrated in FIG. 7, a state variable $X_k$ is divided into two pieces, $Xd_{1k}$ and $Xd_{2k}$. In each of $Xd_{1k}$ and $Xd_{2k}$, the operators $A_k$ and $B_k$ are applied to $A_{11}$, $B_{11}$, ... of FIG. 7 according to a generation method or the like of each scheme described in the first embodiment.

When different modulation mapping schemes are applied to $Xd_{1k}$ and $Xd_{2k}$, the signals $Xd_{1k}$ and $Xd_{2k}$ of OFDM_1 and OFDM_2 are formed for each channel and are subsequently connected (added) to generate $X_k$_New2 on the time axis. Further, channel-multiplexed signals with different modulation mapping scheme content can be generated by operators $A_k$_New2 and $B_k$_New2 for forming CP addition by which distortion of a transmission path can be corrected. The same applies to a case of multiplexing of two channels with different subcarrier intervals.

In channel multiplexing of a case in which signal generation course signals $Xd_{1k}$ and $Xd_{2k}$ with different multicarrier signal schemes are formed, it is essential to separate $Xd_{1k}$ and $Xd_{2k}$ into a case on the frequency axis and a case on the time axis, and connection operation of unifying axis dimensions is essential. This is because orthogonality is ensured for signal synchronization separation.

Accordingly, the time axes or the frequency axes of the different schemes are aligned and then connected. For example, since outputs of the generation course signals of CP-OFDM and UF-OFDM are on the time axis, the outputs are connected (summed) along a route of $X_k$_New2.

In the case of CP-OFDM and UF-OFDM, the outputs may be connected even on the time axis along a route of $X_k$_New1 via $A_{1x}$, $B_{1K}$, $A_{2K}$, and $B_{2K}$ operators changing from the time axis to the frequency axis.

Further, for $Xd_{1k}$ and $Xd_{2k}$, generation course signals may be generated on each frequency axis and $Xd_{1k}$ and $Xd_{2k}$ may be connected on the frequency axis along the route of $X_k$_New1.

A plurality of signals in which generation courses are different can also be generated by connecting a second multicarrier signal $Xc2_k$ (where k=K) generated in a generation course from k=1 to K different from a first multicarrier signal $Xc1_k$ (where k=K) from a symbol located after a first symbol in accordance with Expression (1), to the first multicarrier signal $Xc1_k$ (where k=K) generated in a generation course from k=1 to K from the first (predetermined) symbol by Expression (1) on the time axis.

In a transmission mode in an actual wireless medium, basically, a time sequence signal on the time axis is used. Therefore, when the foregoing $X_k$_New1 and $X_k$_New2 are input, operators $A_k$_New2 and $B_k$_New2 cause generation course signals to generate a signal as a time sequence signal. Here, the suffix k=K of $A_k$_New1, $B_k$_New1, $A_k$_New2, and $B_k$_New2 of FIG. 7 may be the same value as or a different value from the suffix k=K of Expression (1).

Fourth Embodiment

In the embodiment, an operation of the scenario composing unit will be described. A scenario includes any task which can be executed by the signal generation unit 2. The task is, for example, signal generation, signal analysis, feedback, or a communication IF. Kinds of signals to be processed in the task are, for example, OFDM, CP-OFDM, UF-OFDM, FBMC, GFDM, Filtered OFDM, and Windowing-OFDM.

The scenario composing unit 11 binds information necessary for a scenario to each other by a sequencer with reference to a database in which the information is stored. The scenario composing unit 11 converts the bound information into a format which can be executed by the execution unit 12. A command completed in this way is executed by the sequencer.

The database which is referred to by the scenario composing unit 11 stores kinds of multicarrier signals, a code sequence of an input signal, a synchronization code (a pilot pattern and a preamble), the number of subcarriers, the number of symbols, a modulation scheme, a time transmission interval (TTI), and the like. The database may be hierarchically configured in an order of a procedure, the kinds of multicarrier signals, attributes of the multicarrier signals, a code sequence, or the like.

The scenario composing unit 11 may control the execution unit 12 in response to a command from the communication IF 17. For example, the scenario composing unit 11 adds and updates the information stored in the database in response to a command input from the communication IF 17. In this way, in the embodiment, a remote operation can preferably be executed from the outside in a regular command language. The remote operation from the outside is, for example, scenario activation, scenario updating, or parameter updating (code sequence).

The scenario composing unit 11 executes a setting order, a design order, and an execution order to execute a signal generation task. In the setting order of the signal generation task, the signal generation unit 2 acquires information necessary to generate a multicarrier signal. The information necessary to generate the multicarrier signal is, for example, a kind of signal, a code sequence, a synchronization code, the number of subcarriers, the number of symbols, a modulation scheme of executing modulation, a time transmission interval (TTI), an application filter type, presence or absence of filter correction, presence or absence of a CP, the number of CPs. Any information acquisition method can be used. Information may be acquired from the input and output unit 16 of the signal generation unit 2, may be acquired from the communication IF 17, or may be read from a database.

In the design order of the signal generation task, the scenario composing unit 11 sets operators used to calculate the state vector X and an order of the operators according to an input in the setting order. At this time, the scenario composing unit 11 also sets a parameter used to calculate the operators.

In the execution order of the signal generation task, an operation is executed using an execution permission flag with a time-varying system. Thus, it is possible to generate the multicarrier signal of a desired kind of signal, a desired code sequence, a desired synchronization code, the desired number of subcarriers, the desired number of symbols, a desired modulation scheme, and a desired TTI.

The scenario composing unit 11 executes a setting order, a design order, and an execution order to execute a signal analysis task.

In the setting order of the signal analysis task, analysis content is set. The analysis content is, for example, a CCDF process or a constellation process. At this time, the scenario composing unit 11 reads operators and parameters used until the time of derivation of the output vector Y as operators and parameters used to receive the multicarrier signal from the memory 13.

In the design order of the signal analysis task, operators and parameters are set according to an input in the setting order in the evaluation unit 15. For example, when the constellation process is set in the setting order, the scenario composing unit 11 sets the operator $G_{CS}$.

When a received signal is a multicarrier signal generated by the signal generation unit 2, the signal generation unit 2 may read the operators and the parameters used to generate the multicarrier signal from the memory 13. For example, when the operator $T_{iFFT}$ is used until derivation of the output vector Y, the scenario composing unit 11 sets the operator $T_{FFT}$.

In the execution order of the signal analysis task, the evaluation unit 15 causes a time-varying system to execute an operation using an execution permission flag. When feedback is executed, the signal generation task is executed again. At this time, the scenario composing unit 11 updates the parameters of the scenario.

In this way, the signal generation unit 2 can generate a desired signal by repeating a simple matrix structure. Further, the signal generation unit 2 can evaluate the signal and performs feedback of an evaluation result, and thus various parameters can be evaluated by one device. Further, the signal generation unit 2 can flexibly take countermeasures in response to an instruction from a remote site.

Subsequently, the signal reception unit 3 receives the same kind of multicarrier signal as that of the signal generation unit 2 in which a synchronization code of a CAZAC sequence is embedded in a predetermined symbol from the outside. The multicarrier signal from the outside normally includes, for example, disturbance such as transmission loss, noise, or a defect of an external transmitter. The signal reception unit 3 samples a multicarrier signal containing a disturbance as an externally received signal at a predetermined sampling interval Ts. The sampled data is stored as a matrix with the number of rows of a frame length and the preset number of columns in the correlation processing unit 5. The signal reception unit 3 outputs the sampled data sampled at each sampling interval Ts to the first FFT unit 7.

The signal reception unit 3 may have a configuration including a function of executing a filtering process on the externally received signal in conformity with AGC level adjustment or a transmission scheme. The signal reception unit 3 may have a configuration in which an A/D converter is included.

The time sequence data conversion unit 4 samples the internally transmitted signal generated in the signal generation unit 2 at each sampling interval Ts and outputs the sampled data of the internally transmitted signal shifted at the sampling interval Ts. The sampled data is stored as a matrix with the number of rows of a frame length and the preset number of columns in the correlation processing unit 5. The time sequence data conversion unit 4 outputs the sampled data sampled at each sampling interval Ts to the second FFT unit 8.

The correlation processing unit 5 executes cross-correlation calculation of a complex number between sampled data ($Ex_1, Ex_2, \ldots, Ex_n$) of the externally received signal and sampled data ($Ip_1, Ip_2, \ldots, Ip_n$) of the internally transmitted signal processed by the time sequence data conversion unit 4 in, for example, Expression (40) below. The cross-correlation calculation may be executed by Expression (41) below normalized with each piece of correlation data. In Expressions (40) and (41) below, * indicates a complex conjugate calculation and | | is absolute value calculation.

[Math. 40]

$$\left| [Ex1 \quad Ex2 \quad \ldots \quad Exn] \begin{bmatrix} Ip1^* \\ Ip2^* \\ \vdots \\ Ipn^* \end{bmatrix} \right| \quad \text{Expressions (40)}$$

[Math. 41]

$$\left| \frac{[Ex1 \quad Ex2 \quad \ldots \quad Exn] \begin{bmatrix} Ip1^* \\ Ip2^* \\ \vdots \\ Ipn^* \end{bmatrix}}{\sqrt{\sum_{i=1}^{n} |Exi|^2} \sqrt{\sum_{i=1}^{n} |Ipi|^2}} \right| \quad \text{Expressions (41)}$$

The STO timing detection unit 6 sets a signal sequence in which a maximum correlation value is obtained as a result of the correlation calculation by the correlation processing unit 5 as an STO signal sequence in which an STO timing is determined and detects an STO timing at a position at which a frame is extracted at this time.

The first FFT unit 7 demodulates on the sampled data of the externally received signal input at each sampling interval Ts from the signal reception unit 3 through fast Fourier transform and extracts an amplitude phase component of the externally received signal (a complex signal sequence).

The second FFT unit 8 demodulates on the sampled data of the internally transmitted signal input at each sampling interval Ts from the time sequence data conversion unit 4 through fast Fourier transform and extracts an amplitude phase component of each subcarrier in the internally received signal (a complex signal sequence).

The difference calculation unit 9 compares the amplitude phase component of each subcarrier of the externally received signal extracted by the first FFT unit 7 to the amplitude phase component of each subcarrier of the internally transmitted signal extracted by the second FFT unit 8 and calculates a difference between the amplitude phase components of each subcarrier.

The correction control unit 10 performs correction control on the signal generation unit 2 in accordance with a synchronization method to be described below such that a difference in the amplitude phase component of each subcarrier in a state in which the STO timing calculated in the difference calculation unit 9 is detected is added as a correction amount to the internally transmitted signal newly generated by the signal generation unit 2. The correction amount may be only a difference in the phase component.

Next, a synchronization method of the synchronization device 1 with the foregoing configuration will be described. Communication specifications (in view of only transmission and the others are omitted) which are assumption of transmission and reception of the signal are assumed to be determined in advance before start of communication. The communication specifications mentioned here is, for example, the sampling interval Ts, a symbol length, the number of subcarriers, TTI, a frame format, a position and a sequence length (preamble length) of a synchronization code, a temporary modulation format, and a transmission scheme: a waveform scheme.

First, the signal generation unit 2 is set in conformity with the transmission scheme of the communication specification. In an input at this time, a sequence with the preamble length determined in advance is embedded in a symbol. Then, the signal generation unit 2 generates a multicarrier signal as an internally transmitted signal in the order of the classification table of FIG. 8 in conformity with the transmission scheme of the communication specification.

The internally transmitted signal generated by the signal generation unit 2 is sampled at the predetermined sampling interval Ts in the time sequence data conversion unit 4. The sampled data of the internally transmitted signal is stored as a matrix with the number of rows of the frame length and the preset number of columns in the correlation processing unit 5.

On the other hand, the externally received signal is sampled at the predetermined sampling interval Ts in the signal reception unit 3. The sampled data of the externally received signal is stored as the matrix with the number of rows of the frame length and the preset number of columns in the correlation processing unit 5, like the internally transmitted signal.

The correlation processing unit 5 performs matrix calculation on the matrix of the sampled data of the externally received signal and the matrix of the sampled data of the internally transmitted signal in conformity with Expression (42) below and performs a correlation process at the level of the sampling interval Ts. In the correlation process at the level of the sampling interval Ts, correlation calculation of frames of the internally transmitted signal and the externally received signal in which an arrival input preamble data sequence In is arranged in frames of predetermined symbol units in advance is performed to obtain a correlation value. At this time, when the CAZAC sequence code (the complex number sequence with strong autocorrelation is used as a synchronization code, a time sequence frame in a case of the highest correlation value of the autocorrelation is a likelihood symbol frame. That is, the likelihood symbol with the maximum value of a result obtained by executing calculation in a matrix format of Expression (42) below can be obtained. In Expression (42) below, $X_{ki}$ is a row vector of the internally transmitted signal and $In_{ki}$ is an input vector of the externally received signal.

[Math. 42]

$$Cor = |X In^*| = \left| \begin{bmatrix} Xk1 \\ \vdots \\ Xkn \end{bmatrix} \begin{bmatrix} In_{k1}(0) \\ \vdots \\ In_{kn}(3) \end{bmatrix}^* \right|$$

Expressions (42)

Expression (42) above expresses a complex correlation process and indicates STO with an optimum position at which a correlation value Cor is maximum.

For example, in Expression (43) below, $Ip_{ki}$ is a row vector of the internally transmitted signal and $Ex_{ki}$ is an input vector of the externally received signal. $Ip_{ki}$ indicates a case in which a signal sequence delayed by a timing of one sample time is prepared in advance. $Ex_{ki}$ indicates a signal sequence. * means complex conjugate calculation. In this calculation, Ip and Ex may be mutually permutated.

[Math. 43]

$$Cor = \left| \begin{bmatrix} Ip10 & Ip11 & Ipln \\ & \vdots & \\ Ipk0 & Ipk1 & Ipkn \end{bmatrix} \begin{bmatrix} Ex_{k1}(0)^* \\ \vdots \\ Ex_{kn}(3)^* \end{bmatrix} \right|$$

Expressions (43)

Then, the STO timing detection unit 6 detects an input sequence in which the maximum correlation value is determined as an STO signal sequence of the STO timing as a result of the correlation process by the correlation processing unit 5 and determines an extraction position of a frame at this time.

Since it is not understood that the STO signal sequence determined through the foregoing process is optimum or still adjusted, this state is investigated by executing a loop of feedback control.

In the loop of the feedback control, first, an output sequence of a transmission unit by the internally transmitted signal and the STO signal sequence are demodulated on the FFT base to take a difference of each subcarrier No. When the difference value is almost zero, demodulation may be executed in this state. That is, when an EVM value after the demodulation is within a regular range, communication is determined to be possible.

Conversely, when the difference value is not almost zero, it is necessary to execute correction. Accordingly, a difference between the subcarriers of both the FFT units is changed to a format of an $F_C$ matrix and a correction process is executed at a state variable level.

When the correction process is executed at the state variable level, the schemes are classified in a transmission scheme state space expression. The transmission unit of the multicarrier signal can classify the schemes in the transmission scheme state space expression, as illustrated in FIG. 8. In FIG. 8, i of Ai and Bi indicates a timing of a time sequence. In each transmission scheme, the state transitions sequentially from the left to the right, transmission data is transmitted, and the series of operations is repeated in consideration of a transmission timing. For example, when the transmission scheme is CP-OFDM, the state transitions in the order of (0, $M_M$)→($T_{iFFT}$, 0) ($S_{CP}$, 0) and the transmission data is transmitted. When the transmission scheme is GFDM, the state transitions in the order of (0, $M_M$)→($M_T$, 0)→($F_{PR}$, 0)→($T_{iDFT}$, 0)→($S_{CP}$, 0) and the transmission data is transmitted.

The classification table of FIG. 8 also shows a series of operations of a transmission waveform. A unit of a data sequence of the multicarrier signal is a symbol. When the demodulation is executed on the FFT base for each symbol, a complex value can be obtained for each subcarrier No of the symbol and a pair of amplitude and phase of the complex number can be obtained. A numerical value of a difference between the signal sequence of the externally received signal and the signal sequence of the internally transmitted signal is 0, when the two signal sequences are matched. However, when there is an error, the error appears as a residual of the complex number. Since the difference is a residual of the FFT base, the difference is an event of the frequency domain and a correction operator of Op ($F_C$) is generated with the numerical value of the residual. This is a numerical matrix called a control amount.

In the classification table of the state space expression of the above-described signal generation unit 2, the state variable is updated as Expression (44) below in the operator ($T_{iFFT}$, 0) executing inverse fast Fourier transform or at the front stage of the operator ($T_{iDFT}$, 0) executing an inverse discrete time Fourier transform at a position at which the state variable X is inserted. Thereafter, a transmission signal to which a correction amount is added is generated by executing a process according to a table after one index of the state variable of the classification table is added. The correction process is completed by repeating the foregoing operation up to a threshold or less.

[Math. 44]

$$X_{k+1} = O_p(F_C)^* X_k \qquad \text{Expressions (44)}$$

In this way, by repeating the above-described correction process, it is possible to acquire a predetermined correction amount (here, referred to as a CFO correction amount because of the frequency domain). When Δ1 is a first correction amount and Δ2 is a second correction amount, an amount to be secondly corrected is a cumulative value of Δ1 and Δ2.

Through the foregoing process, the synchronization process on the multicarrier signal ends. The STO timing and the CFO correction amount (including the amplitude correction amount) can be extracted after this process. Therefore, by applying the extracted STO timing and CFO correction amount to an actual symbol, it is possible to execute demodulation in which synchronization can be achieved after an extraneous influence is eliminated.

Since the externally received signal arrives at each transmission time interval (TTI), synchronization of the internally transmitted signal can be achieved within a range in which the data captured amount can be processed, and the demodulation is completed.

In this way, in the embodiment, the externally received signal of one symbol is acquired by sampling the sampling interval Ts, correlation calculation with the internally transmitted signal which is a model signal is executed, and a frame at a position at which the maximum correlation value is acquired is detected as an STO timing. Thus, frame detection is substantially determined. Thereafter, further, the correction operator Op ($F_C$) using a difference between in the amplitude phase component (or a phase component) between the complex signal obtained by executing fast Fourier transform on the externally received signal and the internally transmitted signal as the correction amount is generated, the state variable in the frequency domain of the state space is multiplied by Op ($F_C$), and a new state variable at a subsequent stage is generated. Thereafter, calculation of a normal state variable determined in conformity with the scheme is executed to generate the internally transmitted signal. By repeatedly executing the processes, the correction amount of CFO is determined and the synchronization is completed. A control amount obtained in the control course of STO and CFO is a correction amount without change. Therefore, when the externally received signal is corrected using STO as the frame detection and using CFO as an inverse code amount, the synchronized signals can be acquired. STO and CFO are distortion amounts of the reception unit from the transmission unit. When the distortion amounts are registered as a distortion model of transmission and reception, data can be obtained in a new use case and can be available in a test device.

In the synchronization device and the synchronization method according to the embodiment, the signal generation unit is configured in the state space expression to correspond to synchronization of various communication schemes generated in future and the various schemes can be changed in the SDR. Thus, in the structure of the signal generation unit, the extent of an external environment can be extracted as a control amount through feedforward control and feedback control using an external signal as a control law. Since the control amount at that time can be directly accessed to a state amount in the state space expression format, a flexible and efficient synchronization circuit and synchronization method can be obtained.

Since the control amount can be acquired as a numerical value and can be embedded in the state space state variable, a mathematical model of a communication environment can be acquired. Thus, a new signal generation model including an environment can be provided. This nature can also be effectively utilized in a test measurement instrument for signal generation in addition to recovery of actual synchronization.

Incidentally, in the above-described embodiment, the time sequence data conversion unit 4 performs a process of shifting the sampled data of the internally transmitted signal by the sampling interval Ts, and the correlation processing unit 5 executes the correlation process at the level of the sampling interval Ts through a time sequence data conversion process (a rough conversion process) in a sampling time unit. However, the invention is not limited to this configuration. The time sequence data conversion unit 4 can also execute a time sequence data conversion process within a time of the sampling interval Ts, that is, a time sequence data conversion process (a fine conversion process) within the sampling time unit. As the fine conversion process, calculation similar to the rough conversion process can be executed using Expression (43). The conversion process can also be executed on the externally received signal in the signal reception unit 3. When an arrival time delay value is known in advance, the time sequence data conversion unit 4 or the signal generation unit 2 can also execute delay time adjustment based on the arrival time delay value.

The fine conversion process is a process of calculating a value at any position between adjacent sampling points of time sequence data and which is generated at an equal time similarly to the sampling interval. That is, time sequence data at a sampling point at the time of Ts+mΔT (where m is an integer) is generated using the sampling interval Ts as a reference.

Specifically, the time sequence data can be expressed in advance as a matrix of convolution calculation of the input signal and a conversion coefficient group in which assumed positions are used as coefficients. A change in mΔT causes a conversion coefficient to be timely changed.

For example, when coefficients obtained by sampling Sin x/x are {g(0), g(n)} and input matrixes are {$x_{k-1}(0)$, . . . , $x_{k-1}(n)$}, the conversion coefficient group is a type of Toeplitz Matrix of Coefficients. For example, in the case of four pieces of data (four subcarriers), a conversion sequence can be calculated in Expression (45) below.

[Math. 45]

$$X_k = F_{INT} X_{k-1} = \begin{bmatrix} g(0) & g(3) & g(2) & g(1) \\ g(1) & g(0) & g(3) & g(2) \\ g(2) & g(1) & g(0) & g(3) \\ g(3) & g(2) & g(1) & g(0) \end{bmatrix} \begin{bmatrix} x_{k-1}(0) \\ x_{k-1}(1) \\ x_{k-1}(2) \\ x_{k-1}(3) \end{bmatrix} \qquad \text{Expressions (45)}$$

In this way, $X_k$ forms a time sequence signal shifted by $m\Delta T < Ts$ from a reference sequence. Then, for example, when time sequence signals are arranged using a sequence shifted by $\Delta T$ as $X_{k1}$ and using a sequence shifted by $2\Delta T$ as $X_{k2}$, a correlation value Cor can be obtained from Expression (40) described above. $\mathrm{Ip}_{ki}$ is a row vector of the internally transmitted signal and $\mathrm{Ex}_{ki}$ is an input vector of the externally received signal.

The signal generation unit 2, the time sequence data conversion unit 4, the correlation processing unit 5, the STO timing detection unit 6, the first FFT unit 7, the second FFT unit 8, the difference calculation unit 9, and the correction control unit 10 have a configuration in which a memory or a CPU are included and are configured by software by executing a predetermined program.

The preferred embodiments of the synchronization device and the synchronization method according to the invention have been described above, but the invention is not limited to the description and the drawings of the embodiments. That is, other forms, embodiments, operation technologies, and the like apparent to those skilled in the art based on the embodiments are all included in the scope of the invention.

DESCRIPTION OF REFERENCE NUMERALS AND SIGNS 1 synchronization device
2 signal generation unit
3 signal reception unit
4 time sequence data conversion unit
5 correlation processing unit
6 STO timing detection unit
7 first FFT unit
8 second FFT unit
9 difference calculation unit
10 correction control unit
11 scenario composing unit
12 execution unit
13 memory
14 mapper input conversion unit
15 evaluation unit
16 input and output unit
17 communication IF
18 display unit

What is claimed is:

1. A synchronization device comprising:
a signal generation unit that sets the number of subcarriers, information regarding a synchronization code, a signal generation operator, and an order of calculation necessary to generate a predetermined type of multicarrier signal using the signal generation operator, and generates a multicarrier signal in which the synchronization code is embedded in a symbol in accordance with the number of subcarriers, as an internally transmitted signal, based on a calculation of the signal generation operator in the order, the number of subcarriers, and the information regarding the synchronization code;
a signal reception unit that receives a same type of multicarrier signal as the internally transmitted signal as an externally received signal from outside and samples the externally received signal at each sampling interval;
a time sequence data conversion unit that samples the internally transmitted signal generated by the signal generation unit at each sampling interval and outputs sampled data of the internally transmitted signal shifted at the sampling interval;
a correlation processing unit that executes correlation calculation between the sampled data of the internally transmitted signal and sampled data of the externally received signal;
a symbol offset (STO) timing detection unit that detects a position at which a correlation value in the correlation calculation of the correlation processing unit is maximum as an STO timing;
a first FFT unit that executes fast Fourier transform on the sampled data of the externally received signal;
a second FFT unit that executes fast Fourier transform on the sampled data of the internally transmitted signal;
a difference calculation unit that calculates a difference between a phase of each subcarrier of the externally received signal obtained in the first FFT unit and a phase of each subcarrier of the internally transmitted signal obtained in the second FFT unit; and
a correction control unit that executes correction control on the signal generation unit such that a calculated difference is added as a correction amount, the calculated difference being in a phase of each subcarrier in a state in which the STO timing is detected.

2. The synchronization device according to claim 1, wherein the signal generation unit includes
a scenario composing unit that acquires the predetermined type of multicarrier signal and the number of subcarriers and sets signal generation operators and the order of calculation necessary to generate the predetermined type of multicarrier signal, and
an execution unit that acquires a number of input signals in accordance with the number of subcarriers and generates the multicarrier signal from the input signals by calculating the signal generation operators in the order,
wherein the signal generation operators are operators (Ak, Bk) granting time characteristics, frequency characteristic, or through/zero characteristics specified with a suffix k indicating the order,
wherein the operator Bk may be further a mapping conversion operator of an input signal vector U,
wherein the operator Ak sets a state variable Xk (where k=1, . . . , K) indicating a generation course signal of the multicarrier signal as an operational target, and
wherein the predetermined multicarrier signal is generated by repeatedly operating the operators (Ak, Bk) by a recurrence formula of Expression (1) below in accordance with the suffix k:

[Math. 1]

$$X_k = A_k X_{k-1} + Bk\ U \qquad \text{Expression (1).}$$

3. The synchronization device according to claim 2, wherein the scenario composing unit acquires characteristics to be added to the multicarrier signal and sets characteristic addition operators and an order of calculation necessary to add the characteristics,
wherein the execution unit adds the characteristics to the generated multicarrier signal by calculating the characteristic addition operators in the order,
wherein the characteristic addition operators are operators (Ck, Dk) granting characteristics necessary for transmission path distortion, signal evaluation, and device evaluation such as through and zero to the generation course signal, and the operator Dk may be an operator of disturbance noise V, and wherein an evaluation multicarrier signal to which the predetermined characteristics are granted is generated by repeatedly applying the operators (Ck, Dk) by a recurrence formula of Expression (2) below in accordance with the suffix k:

[Math. 2]

$$Y = C_k X_k + D_k V \qquad \text{Expression (2)}.$$

4. The synchronization device according to claim 3, wherein the state variable Xk is divided into a plurality of vectors Xd1k and Xd2k, Expression (1) above is applied to the divided vector Xd1k and other vector Xd2k of the state variable to generate a first generation course signal Xd1k (where k=1, . . . , k) from the divided vector Xd1k of the state variable and generate a second generation course signal Xd2k (where k=1, . . . , K) from the other vector Xd2k, the first and second generation course signals are generation course signals on a frequency axis or a time axis, a generation course signal Xk_New1 in which Xd1k (where k=K) and Xd2k (where k=K) are connected is generated on the frequency axis, and a generation course signal Xk_New2 in which Xd1k (where k=K) and Xd2k (where k=K) are added is generated on the time axis.

5. The synchronization device according to claim 4, wherein a signal is generated by applying Expression (1) above to the generation course signal Xk_New1 or the generation course signal Xk_New2.

6. The synchronization device according to claim 5, wherein a multicarrier signal is generated by further applying Expression (2) to the signal generated by applying Expression (1) above to the generation course signal Xk_New1 or the generation course signal Xk_New2.

7. The synchronization device according to claim 3, wherein with regard to the signal generation operators and the order of the calculation set in the scenario composing unit, Bp1 in a generation course of k=p1 is a mapping conversion operator of the input signal vector U, Apt is an operator of inverse Fourier transform in a generation course of k=p2, when there is CP for synchronization, a generation course of k=p3 is added, a signal generation operator Ap3 in the generation course of k=p3 is an operator adding the CP for synchronization, and 1≤p1<p2<p3<N is satisfied, N being the number of subcarriers, when a filtering process is executed, a generation course of k=p4 is added, a signal generation operator Ap4 in the generation course of k=p4 is an operator adding the filtering process, and p4<p2 and p4<p3 or p2<p4 is satisfied, when a windowing process is executed, a generation course of k=p5 is added, a signal generation operator Ap5 in the generation course of k=p5 is an operator adding the windowing process, and p4<p5<N is satisfied, wherein Ap1=Bp2=Bp3=Bp4=Bp5=0 is satisfied, and wherein the scenario composing unit sets the signal generation operators and the order of the calculation by combining the operators in accordance with presence or absence of the CP for synchronization, presence or absence of the filtering process, or presence or absence of the windowing process.

8. The synchronization device according to claim 3, wherein when Xk is a state vector indicating a state variable of each subcarrier as a vector, Y is an output vector, Ak, Bk, Ck, and Dk are operators used for the state variable, U is an input vector indicating an input signal of each subcarrier as a vector, the correction control unit executes calculation of Expressions (1) and (2) above and updates the state vector by Expression (3) below using a correction operator Op(F$_c$) generated from the correction amount at a front stage at which inverse fast Fourier transform or inverse discrete time Fourier transform is executed:

[Math. 3]

$$X_{k+1} = O_p(F_c) * X_k \qquad \text{Expression (3)}.$$

9. The synchronization device according to claim 2, wherein the state variable Xk is divided into a plurality of vectors Xd1k and Xd2k, Expression (1) above is applied to the divided vector Xd1k and other vector Xd2k of the state variable to generate a first generation course signal Xd1k (where k=1, . . . , K) from the divided vector Xd1k of the state variable and generate a second generation course signal Xd2k (where k=1, . . . , K) from the other vector Xd2k, the first and second generation course signals are generation course signals on a frequency axis or a time axis, a generation course signal Xk_New1 in which Xd1k (where k=K) and Xd2k (where k=K) are connected is generated on the frequency axis, and a generation course signal Xk_New2 in which Xd1k (where k=K) and Xd2k (where k=K) are added is generated on the time axis.

10. The synchronization device according to claim 9, wherein a signal is generated by applying Expression (1) above to the generation course signal Xk_New1 or the generation course signal Xk_New2.

11. The synchronization device according to claim 10, wherein a multicarrier signal is generated by further applying Expression (2) to the signal generated by applying Expression (1) above to the generation course signal Xk_New1 or the generation course signal Xk_New2.

12. The synchronization device according to claim 9, wherein a plurality of signals in which generation courses are different are generated by connecting a second multicarrier signal Xc2k (where k=K) generated in a generation course from k=1 to K different from a first multicarrier signal from a second symbol located after a first symbol by Expression (1) above to the first multicarrier signal Xc1k (where k=K) generated in a generation course from k=1 to K from the first symbol by Expression (1) above on the time axis.

13. The synchronization device according to claim 2, wherein with regard to the signal generation operators and the order of the calculation set in the scenario composing unit, Bp1 in a generation course of k=p1 is a mapping conversion operator of the input signal vector U, Ap2 is an operator of inverse Fourier transform in a generation course of k=p2, when there is CP for synchronization, a generation course of k=p3 is added, a signal generation operator Ap3 in the generation course of k=p3 is an operator adding the CP for synchronization, and 1≤p1<p2<p3<N is satisfied, N being the number of subcarriers, when a filtering process is executed, a generation course of k=p4 is added, a signal generation operator Ap4 in the generation course of k=p4 is an operator adding the filtering process, and p4<p2 and p4<p3 or p2<p4 is satisfied, when a windowing process is executed, a generation course of k=p5 is added, a signal generation operator Ap5 in the generation course of k=p5 is an operator adding the windowing process, and p4<p4<N is satisfied, wherein Ap1=Bp2=Bp3=Bp4=Bp5=0 is satisfied, and wherein the scenario composing unit sets the signal generation operators and the order of the calculation by combining the operators in accordance with presence or absence of the CP for synchronization, presence or absence of the filtering process, or presence or absence of the windowing process.

14. The synchronization device according to claim 2, wherein when Xk is a state vector indicating a state variable of each subcarrier as a vector, Y is an output vector, Ak, Bk, Ck, and Dk are operators used for the state variable, U is an input vector indicating an input signal of each subcarrier as a vector, the correction control unit executes calculation of Expressions (1) and (2) above and updates the state vector by Expression (3) below using a correction operator Op(F$_c$) generated from the correction amount at a front stage at which inverse fast Fourier transform or inverse discrete time Fourier transform is executed:

[Math. 3]

$$X_{k+1} = O_p(F_C)^* X_k \qquad \text{Expression (3).}$$

15. The synchronization device according to claim 2, wherein the time sequence data conversion unit generates time sequence data of a sample point at a time of Ts+mΔT (where m is an integer) at which Ts is a reference when Ts is the sampling interval.

16. The synchronization device according to claim 1, wherein the time sequence data conversion unit generates time sequence data of a sample point at a time of Ts+mΔT (where m is an integer) at which Ts is a reference when Ts is the sampling interval.

17. A synchronization method comprising:

a step of setting the number of subcarriers, information regarding a synchronization code, a signal generation operator, and an order of calculation necessary to generate a predetermined type of multicarrier signal using the signal generation operator, and generating a multicarrier signal in which the synchronization code is embedded in a symbol in accordance with the number of subcarriers, as an internally transmitted signal, based on a calculation of the signal generation operator in the order, the number of subcarriers, and the information regarding the synchronization code;

a step of receiving a same type of multicarrier signal as the internally transmitted signal as an externally received signal from outside and sampling the externally received signal at each sampling interval;

a step of sampling the internally transmitted signal at each sampling interval and outputting sampled data of the internally transmitted signal shifted at the predetermined sampling interval;

a step of executing correlation calculation between the sampled data of the internally transmitted signal and sampled data of the externally received signal;

a step of detecting a position at which a correlation value in the correlation calculation is maximum as an STO timing;

a step of executing fast Fourier transform on the sampled data of the externally received signal;

a step of executing fast Fourier transform on the sampled data of the internally transmitted signal;

a step of calculating a difference between a phase of each subcarrier of the externally received signal obtained in the fast Fourier transform and a phase of each subcarrier of the internally transmitted signal obtained in the fast Fourier transform; and a step of executing correction control on generation of the internally transmitted signal such that a calculated difference is added as a correction amount, the calculated difference being in a phase of each subcarrier in a state ii which the STO timing is detected.

18. The synchronization method according to claim 17, further comprising:

a step of executing calculation of Expressions (4) and (5) above when Xk is a state vector indicating a state variable of each subcarrier as a vector, Y is an output vector, Ak, Bk, Ck, and Dk are operators used for the state variable, U is an input vector indicating an input signal of each subcarrier as a vector, and V is a disturbance vector indicating disturbance of each subcarrier as a vector; and a step of updating the state vector by Expression (6) below using a correction operator Op(F$_c$) generated from the correction amount at a front stage at which inverse fast Fourier transform or inverse discrete time Fourier transform is executed:

[Math. 4]

$$X_k = A_k X_{k-1} + B_k U \qquad \text{Expression (4)}$$

[Math. 5]

$$Y = C_k X_k + D_k V \qquad \text{Expression (5)}$$

[Math. 6]

$$X_{k+1} = O_p(F_c)^* X_k \qquad \text{Expression (6).}$$

19. The synchronization method according to claim 18, further comprising:

a step of generating time sequence data of a sample point at a time of Ts+mΔT (where m is an integer) at which Ts is a reference when Ts is the sampling interval.

20. The synchronization method according to claim 17, further comprising:

a step of generating time sequence data of a sample point at a time of Ts+mΔT (where m is an integer) at which Ts is a reference when Ts is the sampling interval.

* * * * *